US012632929B2

(12) United States Patent (10) Patent No.: US 12,632,929 B2
Chen et al. (45) Date of Patent: May 19, 2026

(54) DEPTH OF FIELD MODIFICATION IN IMAGES USING MACHINE LEARNING

(71) Applicant: Google LLC, Mountain View, CA (US)

(72) Inventors: Stanley Wei Xian Chen, Mountain View, CA (US); Edward Te-Hua Chang, Mountain View, CA (US); Jwalant Bhatt, San Jose, CA (US); Joachim Lerman, Sunnyvale, CA (US); Elizabeth Weeks, San Francisco, CA (US)

(73) Assignee: Google LLC, Mountain View, CA (US)

( * ) Notice: Subject to any disclaimer, the term of this patent is extended or adjusted under 35 U.S.C. 154(b) by 137 days.

(21) Appl. No.: 18/778,725

(22) Filed: Jul. 19, 2024

(65) Prior Publication Data

US 2026/0024165 A1 Jan. 22, 2026

(51) Int. Cl.
  *G06T 5/50* (2006.01)
  *G06T 3/40* (2024.01)
  *G06T 5/70* (2024.01)
  *G06T 7/50* (2017.01)
  *H04N 23/67* (2023.01)

(52) U.S. Cl.
  CPC ................. *G06T 5/50* (2013.01); *G06T 3/40* (2013.01); *G06T 5/70* (2024.01); *G06T 7/50* (2017.01); *H04N 23/67* (2023.01); *G06T 2207/20084* (2013.01); *G06T 2207/20132* (2013.01); *G06T 2207/20221* (2013.01)

(58) Field of Classification Search
  CPC .... G06T 5/50; G06T 3/40; G06T 5/70; G06T 7/50; G06T 2207/20084; G06T 2207/20132; G06T 2207/20221; H04N 23/67
  See application file for complete search history.

(56) References Cited

U.S. PATENT DOCUMENTS

2013/0057655 A1    3/2013  Su et al.
2021/0073959 A1    3/2021  Elmalem et al.
2023/0153960 A1*   5/2023  Garg ........................ G06T 5/50
                                        382/255

OTHER PUBLICATIONS

Wang, et al., "DeepLens: Shallow Depth of Field From a Single Image", https://arxiv.org/abs/1810.08100, Oct. 18, 2018, 11 pages.

* cited by examiner

*Primary Examiner* — Haixia Du
(74) *Attorney, Agent, or Firm* — McDonnell Boehnen Hulbert & Berghoff LLP

(57) ABSTRACT

Implementations described herein relate to modifying depth of field in images using machine learning. In some implementations, a computer-implemented method for training a machine learning model includes generating an input training image that is a composition of multiple images captured in focus stacks at different lens focus positions and camera distances. A corresponding ground truth image is generated from merged images in particular focus stacks. A convolutional neural network (CNN) machine learning (ML) model receives the input training image and outputs an output image that adjusts blurriness in the input training image to simulate a target depth of field. The CNN ML model is updated based on comparison of the output image and the ground truth image. The CNN ML model can include a depth CNN that performs an implicit depth estimation for features of the input image, and a deconvolution CNN that adjusts the blurriness.

20 Claims, 7 Drawing Sheets

300

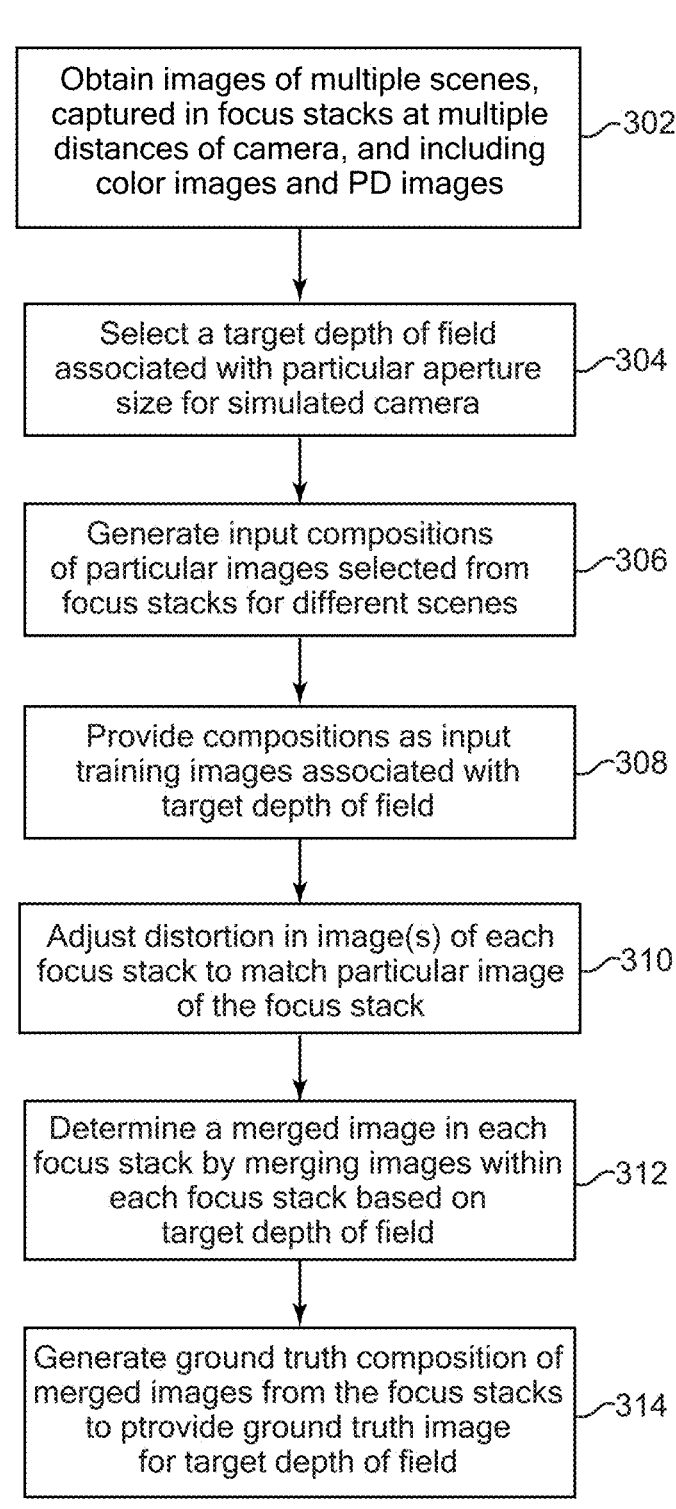

Obtain images of multiple scenes, captured in focus stacks at multiple distances of camera, and including color images and PD images ⟋302

Select a target depth of field associated with particular aperture size for simulated camera ⟋304

Generate input compositions of particular images selected from focus stacks for different scenes ⟋306

Provide compositions as input training images associated with target depth of field ⟋308

Adjust distortion in image(s) of each focus stack to match particular image of the focus stack ⟋310

Determine a merged image in each focus stack by merging images within each focus stack based on target depth of field ⟋312

Generate ground truth composition of merged images from the focus stacks to ptrovide ground truth image for target depth of field ⟋314

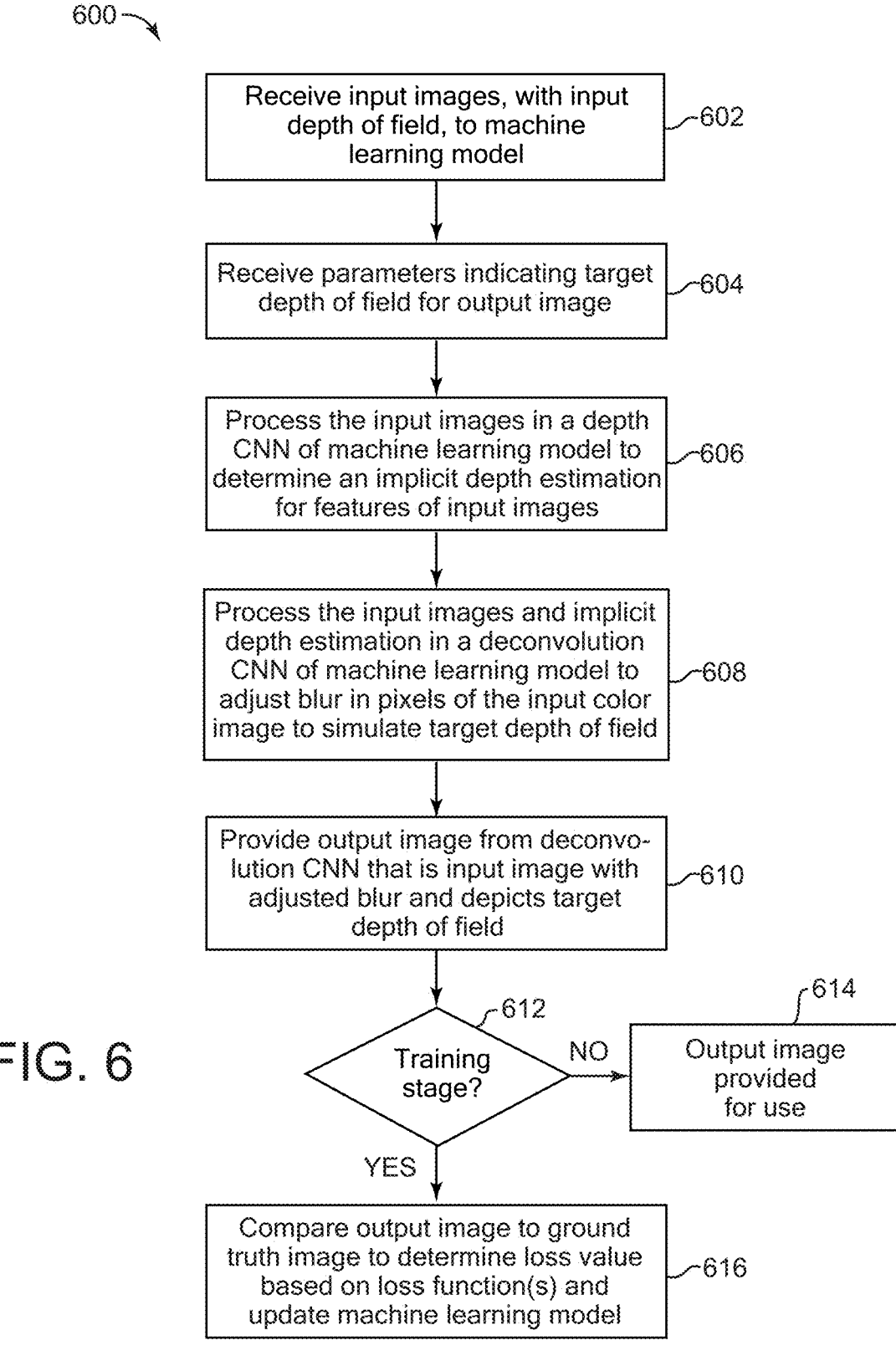

Receive input images, with input depth of field, to machine learning model ⌐602

Receive parameters indicating target depth of field for output image ⌐604

Process the input images in a depth CNN of machine learning model to determine an implicit depth estimation for features of input images ⌐606

Process the input images and implicit depth estimation in a deconvolution CNN of machine learning model to adjust blur in pixels of the input color image to simulate target depth of field ⌐608

Provide output image from deconvolution CNN that is input image with adjusted blur and depicts target depth of field ⌐610

Training stage?

NO

614

Output image provided for use

YES

Compare output image to ground truth image to determine loss value based on loss function(s) and update machine learning model ⌐616

DEPTH OF FIELD MODIFICATION IN IMAGES USING MACHINE LEARNING

BACKGROUND

Consumer cameras have physical apertures which impose a trade-off between light transmission and depth of field (DOF) in images captured by the cameras. For example, a larger aperture captures more light but reduces the DOF in the image, which is the range of distances in which objects are in focus. Conversely, a smaller aperture restricts the amount of light, which makes it more difficult to capture low-light scenes but increases the DOF in the image. A larger DOF reveals more detail in an image scene by bringing more objects in focus, while a smaller DOF provides more blur in the scene and can be used to achieve an artistic style or to direct a viewer's attention by blurring out unwanted areas. Traditionally, achieving a low/shallow DOF requires the use of a large aperture, and conversely, achieving a high/wide DOF requires the use of a small aperture.

The DOF of images can be manipulated to obtain desired visual effects. DOF manipulation traditionally requires acquisition of multiple images of a scene which can be time-consuming and prone to alignment issues. Deep-learning based methods in machine learning models can also be used to adjust DOF in images, where the models are trained on the relationship between images and depth maps, together with sharpening techniques such as blind deblurring. However, these techniques rely on ground truth depth maps generated using traditional techniques, which may be laborious and error-prone.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations described herein relate to methods, devices, and computer-readable media relating to modifying depth of field (DOF) in images using machine learning. In some implementations, a computer-implemented method includes obtaining a plurality of images captured with a camera, each image depicting a respective scene of a plurality of scenes. For each scene, multiple focus stacks of images are captured, individual images in each focus stack are captured at a respective lens focus position of a plurality of lens focus positions of the camera, and individual focus stacks of the multiple focus stacks for the scene are captured at a respective distance of a plurality of distances of the camera to the scene. The method includes selecting a target depth of field that is associated with a particular f-stop of a simulated camera, and generating an input training image that is an input image composition of particular images that are at least portions of the plurality of images, wherein each of the particular images is from a respective particular focus stack for a different scene. The method includes determining a merged image for each particular focus stack, wherein determining the merged image is based on, for each particular focus stack, merging two or more images in the particular focus stack in a focus stacking operation based on the target depth of field to determine the merged image for the particular focus stack. The method includes generating a ground truth image that is a ground truth composition of the merged images, wherein the ground truth composition corresponds to the input image composition. The method includes providing the input training image and the target depth of field as inputs to a convolutional neural network (CNN) machine learning (ML) model, outputting, by the CNN ML model, an output image that is obtained by adjusting blurriness in the input training image to obtain the target depth of field, and updating the CNN ML model based on a loss value determined based on comparison of the output image and the ground truth image, wherein the updating includes adjusting one or more parameters of the CNN ML model based on the loss value.

Various features of the method are disclosed. For example, in some implementations, the plurality of images are color images, and the method further includes generating a plurality of input phase difference (PD) image compositions that correspond to the input image composition, each input PD image composition including a plurality of PD images that correspond to the particular images of the input image composition, and providing the plurality of input PD image compositions as input to the CNN ML model. In some implementations, the machine learning model includes: a depth convolutional neural network (CNN) configured to determine an implicit depth estimation for depicted features of the input image composition based on the input PD image compositions; and a deconvolution CNN configured to receive the input image composition from the depth CNN, adjust blur in the input image composition based on the implicit depth estimation and based on the target depth of field, and output the output image.

In some implementations, determining the merged image for each particular focus stack includes, for each of the particular focus stacks, prior to merging the two or more images, adjusting distortion of one or more images in the particular focus stack such that all the images in the particular focus stack are matched in distortion to the particular image of the particular focus stack. In some implementations, adjusting the distortion is based on a feature-matching homography technique that matches features of the one or more images to the particular image of the focus stack.

In some implementations, the method further comprises, prior to generating the input training image, randomly selecting the particular focus stacks from the plurality of images such that multiple focus stacks include images captured at different distances from the camera to a respective scene. In some implementations or cases, each of the particular images is captured at a lens focus position that is closest to a center of a depth of field of the images in the particular focus stack of the particular image. In some implementations, the loss value is determined based on comparison of the output image and the ground truth image by applying a loss function that includes an L1 loss function and a gradient-L1 loss function. In some implementations, generating the input training image that is the input image composition is performed using a random occlusion-based composition technique that includes randomly cropping and/or resizing one or more of the plurality of images in the particular focus stacks to obtain the particular images in the input image composition. In some implementations, each of the scenes is provided on a physical photo or a printout that includes the scene.

In some implementations, a system includes a processor and a memory coupled to the processor, with instructions stored thereon that, when executed by the processor, cause the processor to perform operations. The operations include providing an input image and corresponding phase difference (PD) images as an input to a machine learning model, wherein the input image is associated with an input depth of field, and providing, to the machine learning model, a parameter indicating a target depth of field, wherein the target depth of field is different than the input depth of field. The operations include processing the input image in a depth convolutional neural network (CNN) of the machine learning model, wherein the depth CNN performs an implicit depth estimation for depicted features of the input image based on the corresponding PD images, and processing the input image and implicit depth estimation in a deconvolution CNN of the machine learning model, wherein the deconvolution CNN adjusts blur in pixels of the input image based on the implicit depth estimation to simulate the target depth of field. The operations include providing an output image from the deconvolution CNN that is a modified version of the input image with the adjusted blur.

Various features of the system are disclosed. For example, in some implementations, the operations further include training the CNN ML model by: obtaining a plurality of images captured with a camera, each image depicting a respective scene of a plurality of scenes, wherein for each scene, multiple focus stacks of images are captured, individual images in each focus stack are captured at a respective lens focus position of a plurality of lens focus positions of the camera, and individual focus stacks of the multiple focus stacks for the scene are captured at a respective distance of a plurality of distances of the camera to the scene; selecting a training target depth of field that is associated with a particular f-stop of a simulated camera; generating an input training image that is an input image composition of particular images that are at least portions of the plurality of images, wherein each of the particular images is from a respective particular focus stack of the multiple focus stacks for a different scene of the plurality of scenes; generating a plurality of input PD image compositions for the input image composition, the input PD image compositions including a plurality of PD images that correspond to the input image composition; determining a merged image for each particular focus stack based on, for each particular focus stack, merging two or more images in the particular focus stack in a focus stacking operation based on the training target depth of field to determine the merged image; generating a ground truth image that is a ground truth composition of the merged images, the ground truth composition corresponding to the input image composition; providing the input training image, the input PD image compositions, and the training target depth of field as inputs to the depth CNN of the machine learning model, and outputting, by the deconvolution CNN, an output training image obtained by adjusting blurriness in the input training image to obtain the training target depth of field; and updating the machine learning model based on a loss value determined based on comparison of the output training image and the ground truth image, including adjusting one or more parameters of the machine learning model based on the loss value.

In some implementations, determining the merged images for each particular focus stack includes, for each of the particular focus stack, adjusting distortion of one or more images in the particular focus stack such that all the images in the particular focus stack are matched in distortion to the particular image of the particular focus stack. In some implementations, the system further includes a camera and a display screen coupled to the processor, and the operations further include capturing the input image using the camera; and causing the output image to be displayed on the display screen. In some implementations, a delay between capturing the input image and causing the output image to be displayed is less than a time threshold such that the output image is displayed on the display screen substantially in real-time. In some implementations, the system further includes an input device coupled to the processor, and the operations further include receiving user input indicative the target depth of field via the input device. Some implementations provide a computer-implemented method that performs operations that include one or more of the operations described above for the system.

Some implementations provide a device that includes a processor and a memory coupled to the processor. The memory may have instructions stored thereon that, when executed by the processor, cause the processor to perform operations that include one or more of the features described above for the methods. Some implementations provide a non-transitory computer-readable medium with instructions stored thereon that, when executed by a processor, cause the processor to perform operations that may be similar to one or more features described above for the methods and/or systems.

BRIEF DESCRIPTION OF THE DRAWINGS

FIG. 3 is a flow diagram illustrating an example method to generate training images for training a machine learning model to modify depth of field in images, according to some implementations.

FIG. 6 is a flow diagram illustrating an example method to modify depth of field in an input image using a machine learning model, according to some implementations.

DETAILED DESCRIPTION

Figure 1:
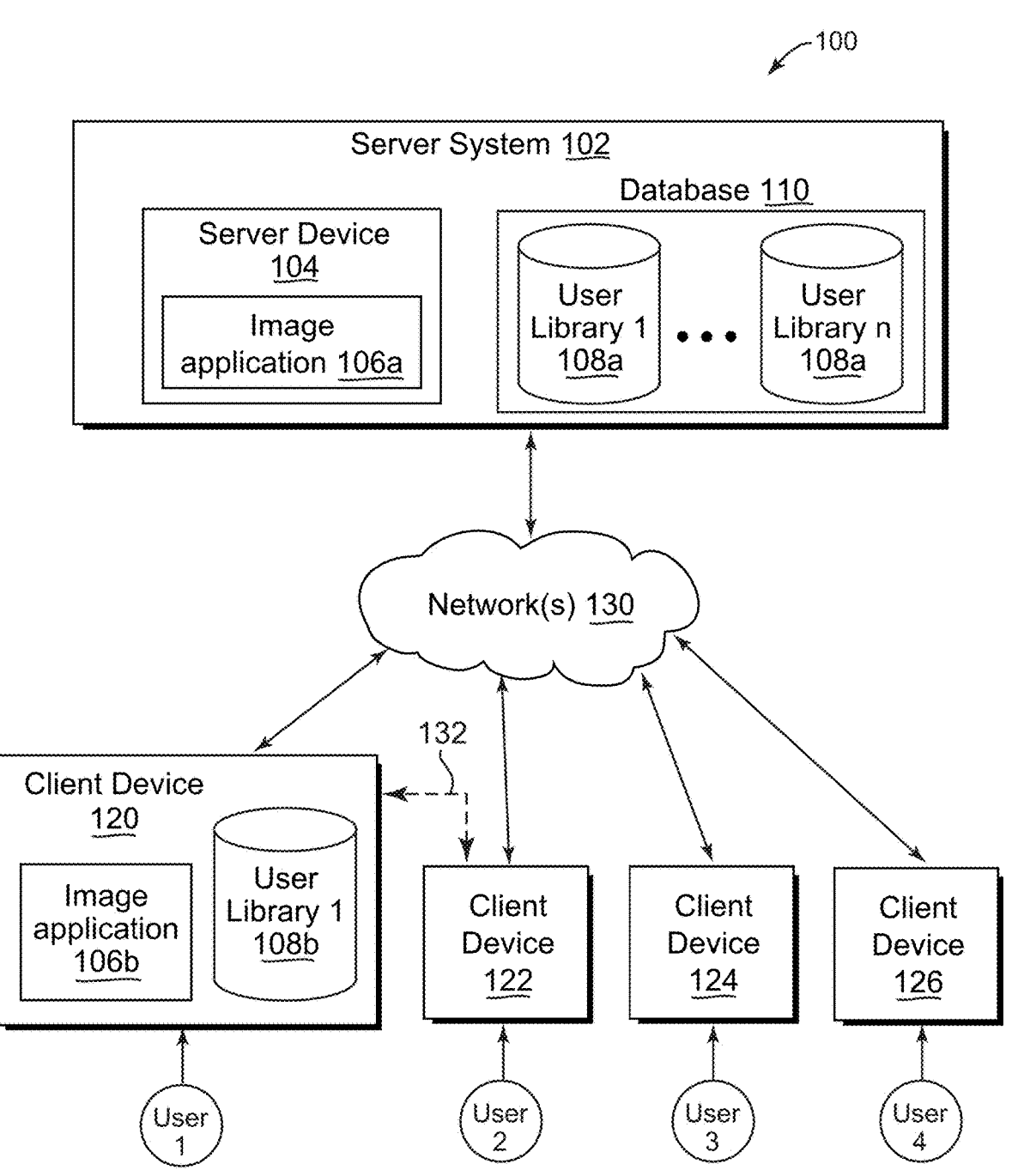
FIG. 1 is a block diagram of an example network environment which may be used for one or more implementations described herein.

This disclosure relates to modifying depth of field (DOF) in single frame images using a pre-trained machine learning (ML) model. In some implementations, the pre-trained ML model may be deployed on a portable computing device such as a smartphone, tablet, digital camera, or other device with a camera and a processor. The single frame image may be captured by a camera lens of the portable computing device and processed by the pre-trained ML model (which is on-device and is executed on the device processor such as a main processor, a machine-learning processor, or other processing unit) to produce an output image with a modified DOF that can be displayed in near real-time on a display screen of the portable computing device. User input may be received indicative of a target DOF and the output image may be updated accordingly. Various implementations may therefore enable users to use portable computing devices to capture images with any suitable DOF, even when the device does not include hardware that allows adjusting an aperture during image capture.

Some implementations relate to training a machine learning model to dynamically modify DOF in an input image. In some implementations, training images are generated to train the machine learning model to adjust a depth of field in an input image to a target depth of field. To generate training images, focus stacks of multiple color (e.g., RGB) images depicting different scenes are captured by a camera. Each focus stack includes images from a focus sweep that are captured at different lens focus positions of the camera, and multiple such focus stacks are captured at different distances of the camera to the scene (different focus diopters). For example, the scenes can be provided on printouts or physical photos. Phase difference (PD) images of the scenes are also captured using the autofocus components of the camera, where captured PD images correspond to each of the captured color images.

An input training image is generated as an input image composition of randomly selected images of the captured color images. For example, a target depth of field is selected for the target output image, and particular focus stacks are randomly selected from the captured image such that the focus stacks are captured at different distances from camera to scene. A particular image from each particular focus stack is selected to be included in the composition. For example, for some input image compositions, the particular image can be the sharpest image (most in focus) in the focus stack, e.g., captured at a lens focus position that is closest to a center of the depth of field of the images in the focus stack. For example, images in a focus stack can span different sections of the defocus range, and if a particular span is centered about a zero-defocus point, then this span is closest to a center of the depth of field. In some implementations, the input image composition can be generated from the particular images using a random composition technique, e.g., that crops random portions of the particular images. Two phase difference (PD) training images are also generated as PD image compositions that correspond to the input image composition, where the PD images include PD images that correspond to the color images used in the input image composition.

A ground truth image is also generated as a ground truth composition, which has the target depth of field. A merged image is created for each particular focus stack, by adjusting distortion of images such that all images in the focus stack are matched in distortion to the particular image of the focus stack. Two or more images in the particular focus stack are then merged in a focus stacking operation based on the target depth of field to determine the merged image for the particular focus stack. For example, the focus stacking operation combines the depth of fields of multiple images at different focus positions to extend the depth of field. The ground truth composition corresponds to the input image composition with the same layout of images (e.g., substituting merged images for the images used in the input image composition), and can be generated from the merged images using the same random composition technique as used for the input image composition.

The input training images and the target depth of field are inputs to a convolutional neural network (CNN) machine learning model to train the machine learning model to adjust the blurriness in the input image to provide an output image having the target depth of field (e.g., a blurred output image). For example, the CNN machine learning model can include a depth CNN configured to determine an implicit depth estimation (e.g., depth map) for depicted features of the input color image based on the corresponding PD images. A deconvolution CNN is configured to receive the input color image from the depth CNN, adjust blur in the input color image based on the implicit depth estimation and on the target depth of field, and output an output color image that depicts features having the target depth of field. The amount of blurring performed depends on the depth of the scene relative to the focal plane. Thus, the machine learning model can vary the amount of deblurring (or blurring) based on a defocus level of the scene and based on an external parameter which identifies the target depth of field (e.g., f-stop number or aperture size) to be simulated.

In the training stage, the output image of the CNN machine learning model is compared to the ground truth image used as ground truth data to adjust the blurriness in the input image. For example, a loss function that includes an L1 loss function and a gradient-L1 loss function can be applied to determine a loss value based on the comparison, to update the machine learning model. In an inference stage, the input images are new images, e.g., captured by a camera, and are processed by the CNN machine learning model to provide an output image with the target depth of field.

Described techniques include machine learning-based techniques for manipulating depth of field in images, and allow image capture with a synthetic adjustable aperture using the machine learning techniques. These techniques can be performed on single-frame images and/or on a stream of such images, e.g., a video or other series of images, captured by a camera. Input images can be modified to have the adjusted depth of field, or output images with the adjusted depth of field can be produced and stored separate from the input images. In some examples, images can be displayed in a digital viewfinder of a camera (e.g., screen of a portable device) and the depth of field can be adjusted in real-time and the output image from the trained ML model displayed as a preview to allow a user to view the depth of field adjustment before the captured image is stored. This allows a user to view various levels of depth of field extension or reduction to mimic a traditional depth of field manipulation via variable aperture sizes, e.g., when physical hardware for aperture adjustment is not available. In some examples, these techniques can provide a frame rate of several frames per second, providing real-time imaging inference for live previews that include the adjusted depth of field.

Described features advantageously provide a machine learning model that adjusts a depth of field in an image. Described techniques enable the efficient generation of a large and diverse dataset of training images with varying depths of field, scene variety, and composition, which facilitates the training of the machine learning model and generalizes well to real-world scenes. These techniques are useful and eliminate the expensive and time-consuming work of capturing a large dataset of natural 3D scenes to use a training dataset. In addition, described features use phase difference (PD) images to assist in the determination of depth in images by the machine learning model, and the PD images can be captured by the autofocus features in most cameras, in contrast to having to directly and reliably sense depth in captured scenes which many cameras are not able to perform (e.g., lack hardware/software capabilities). Furthermore, rendering-based synthesis of a set of training images introduces errors based on the accuracy of the 3D rendering, as well errors in the optical simulation used to recreate a real image coming from a physical camera system. Since described techniques use real-world images captured with a real camera system as a source to synthesize 3D scenes utilized to train the ML model, optical accuracy is preserved in output images obtained from the trained ML model.

Furthermore, described techniques can accurately and efficiently simulate different depths in a training image by compositing different portions of images that are focused at different depths, into a training image composition. Furthermore, many different such compositions (a sufficiently large number to train a model) can be generated from a relatively small sample of captured images, thus providing many training images for the machine learning model.

Furthermore, described techniques provide a machine learning model that includes two image transformation stages: predicting depth information of the scene of the input image, and selectively adjusting the blur in the input image to simulate different depths of field. Both of these stages are trained together, such that an implicit depth map is used within the model and an explicit depth map for images is never created or used. This allows a ground truth image to be input directly to the model as ground truth data during training and bypasses the use of explicit depth maps, which saves processing and other computational resources. For example, in previous techniques, model training utilized RGB images and explicit ground truth depth maps that were generated with techniques that were laborious and error-prone.

FIG. 1 illustrates a block diagram of an example network environment 100, in which some implementations described herein may be employed. Network environment 100 includes one or more server systems, e.g., server system 102 in the example of FIG. 1, and a plurality of client devices, e.g., client devices 120-126, each associated with a respective user of users User 1-User 4. Each of server system 102 and client devices 120-126 may be configured to communicate via a network 130.

Server system 102 can include a server device 104 and a database 110. In some implementations, server device 104 may provide speech application 106a. In FIG. 1 and the remaining figures, a letter after a reference number, e.g., "106a," represents a reference to the element having that particular reference number. A reference number in the text without a following letter, e.g., "106," represents a general reference to embodiments of the element bearing that reference number.

Database 110 may be stored on a storage device that is part of server system 102. In some implementations, database 110 may be implemented using a relational database, a key-value structure, or other type of database structure. In some implementations, database 110 may include a plurality of partitions, each corresponding to a respective library for each of users 1-4. For example, as seen in FIG. 1, database 110 may include a first library (user library 1, 108a) for user 1, and other libraries (user library 2, . . . , user library n) for various other users. While FIG. 1 shows a single database 110, it may be understood that database 110 may be implemented as a distributed database, e.g., over a plurality of database servers. Further, while FIG. 1 shows a plurality of partitions, one for each user, in some implementations, each library may be implemented as a separate database.

Library 108a may store content data associated with user 1 (such as images, videos, etc.), metadata associated with the content data, and one or more other database fields, stored in association with the content data. Access permissions for library 108a may be restricted such that user 1 can control how content data in library 108a may be accessed, e.g., by application 106, by other applications, and/or by one or more other users. Server system 102 may be configured to implement the access permissions, such that data of a particular user is accessible only as permitted by the user.

Network environment 100 can include one or more client devices, e.g., client devices 120, 122, 124, and 126, which may communicate with each other and/or with server system 102 via network 130. Network 130 can be any type of communication network, including one or more of the Internet, local area networks (LAN) such as WiFi networks, wide area networks (WAN) such as cellular networks, wireless networks, switch or hub connections, etc. In some implementations, network 130 can include peer-to-peer communication between devices, e.g., using peer-to-peer wireless protocols (e.g., Bluetooth®, Wi-Fi Direct, etc.), etc. One example of peer-to-peer communication between two client devices 120 and 122 is shown by arrow 132.

In various implementations, users 1, 2, 3, and 4 may communicate with server system 102 and/or each other using respective client devices 120, 122, 124, and 126. In some examples, users 1, 2, 3, and 4 may interact with each other via applications running on respective client devices and/or server system 102 and/or via a network service, e.g., a social network service or other type of network service, implemented on server system 102. For example, respective client devices 120, 122, 124, and 126 may communicate data to and from one or more server systems, e.g., server system 102.

In some implementations, the server system 102 may provide appropriate data to the client devices such that each client device can receive communicated content or shared content uploaded to the server system 102 and/or a network service. In some examples, users 1-4 can interact via audio or video conferencing, audio or image data sharing, audio, video, or text chat, or other communication modes or applications. In some implementations, client devices can communicate directly with each other, e.g., using peer-to-peer communications between client devices. In some implementations, a "user" can include one or more programs or virtual entities, as well as persons that interface with the system or network.

In some implementations, any of client devices 120, 122, 124, and/or 126 can provide one or more applications. For example, as shown in FIG. 1, client device 120 may provide image application 106b. Client devices 122-126 may also provide similar applications. Image application 106a may be implemented using hardware and/or software of client device 120. In different implementations, image application 106a may be a standalone client application, e.g., executed on any of client devices 120-126, or may work in conjunction with image application 106b provided on server system 102.

Image application 106 may provide various features, implemented with user permission, that are related to image processing and/or output. For example, image processing features provided by image application 106 can include one or more of receiving images (include videos, collages, etc.) from one or more other devices, modifying the image data (e.g., automatically and/or based on user input), storing image data (with user permission and as specified in user settings) in a library 108 (e.g., as standalone image files and/or included in other types of data files), receiving and processing image data, providing user interfaces to output and/or edit image data, etc. In some implementations, image application 106 includes additional features besides image data processing functions. For example, a communications application (e.g., chat application, videoconference application, etc.) can be considered an image application that includes image processing as well as processing of other types of data, e.g., audio data, text, etc.

In various implementations, with user permission, the features provided by image application 106 may include programmatically analyzing image data to determine image features in the image data (e.g., recognized objects, landscape features, etc.) using one or more user-permitted techniques such as image recognition, etc. In some implementations, image application 106 can generate one or more labels for each image feature detected in image data and store the labels in library 108. The labels for each image may be stored in association with the image data segment in library 108. In some implementations, with user permission, image application 106 may programmatically analyze image data to generate related data and store such data in library 108. For example, image application 106 can generate image data labels (e.g., using image recognition techniques).

Image application 106 can perform or interface with techniques described herein. For example, image application 106 can receive input images (e.g., input training images, input phase difference images, ground truth images, etc.), can receive parameters (e.g., target depth of field), can provide the input images to a machine learning model as described herein (e.g., implemented on client device 120-126, server system 102, or partially on both), and generate output images having modified depth of field using one or more features described herein. For example, the modified images can be output and displayed by the device executing image application 106, and/or can be transmitted to one or more other devices such as server system 102 (or other server system) or one or more client devices 120-126. Upon generating the output image, image application 106 may update library 108 to store the generated image data.

While the foregoing description refers to a variety of features of image application 106, it will be understood that in various implementations, image application 106 may provide fewer or more features. Further, each user is provided with options to enable and/or disable certain features.

Client device 120 may include a library 108b of user 1, which may be a standalone library. In some implementations, library 108b may be usable in combination with library 108a on server system 102. For example, with user permission, library 108a and library 108b may be synchronized via network 130. In some implementations, library 108 may include image data (e.g., standalone images, images included in video, etc.) associated with user 1, e.g., images captured and uploaded by the user, image data shared with the user 1 (e.g., from respective other client devices and/or libraries of other users 2-4), image data downloaded by the user 1 (e.g., from websites, from messaging applications, etc.), and other image data. In some implementations, library 108b on client device 120 may include a subset of image data that is stored by library 108a on server system 102. For example, such implementations may be advantageous when a limited amount of storage space is available on client device 120.

In different implementations, client device 120 and/or server system 102 may include other applications (not shown) that may be applications that provide various types of functionality, e.g., audio capture and/or editing, calendar, address book, e-mail, web browser, shopping, transportation (e.g., taxi, train, airline reservations, etc.), entertainment (e.g., a music player, a video player, a gaming application, etc.), social networking (e.g., messaging or chat, audio/video calling, sharing images/video, etc.) and so on. In some implementations, one or more of the other applications may be standalone applications that execute on client device 120.

In some implementations, one or more of the other applications may access a server system, e.g., server system 102, that provides data and/or functionality of the other applications.

A user interface on a client device 120, 122, 124, 126 and/or 140 can enable the display of user content and other content, including audio content, images, video, text, and other content as well as communications, privacy settings, notifications, and other data. Such a user interface can be displayed using software on the client device, software on the server device, and/or a combination of client software and server software executing on server device 104, e.g., application software or client software in communication with server system 102. The user interface can be displayed by a display device of a client device or server device, e.g., a touchscreen or other display screen, projector, etc. In some implementations, application programs running on a server system can communicate with a client device to receive user input at the client device and to output data such as visual data, audio data, etc. at the client device.

For case of illustration, FIG. 1 shows one block for server system 102, server device 104, database 110, and shows blocks for client devices 120, 122, 124, and 126. Server blocks 102, 104, and 110 may represent multiple systems, server devices, and network databases, and the blocks can be provided in different configurations than shown. For example, server system 102 can represent multiple server systems that can communicate with other server systems via the network 130. In some implementations, server system 102 can include cloud hosting servers, for example. In some examples, database 110 may be stored on storage devices provided in server system block(s) that are separate from server device 104 and can communicate with server device 104 and other server systems via network 130.

Also, there may be any number of client devices. Each client device can be any type of electronic device, e.g., desktop computer, laptop computer, portable or mobile device, cell phone, smartphone, tablet computer, television, TV set top box or entertainment device, wearable devices (e.g., display glasses or goggles, earbuds or headphones, wristwatch, headset, armband, jewelry, etc.), personal digital assistant (PDA), media player, game device, etc. In some implementations, network environment 100 may not have all of the components shown and/or may have other elements including other types of elements instead of, or in addition to, those described herein.

Other implementations of features described herein can use any type of system and/or service. For example, any of various networked services (e.g., connected to the Internet) can be used. Any type of electronic device can make use of features described herein. Some implementations can provide one or more features described herein on one or more client or server devices disconnected from or intermittently connected to computer networks. In some examples, a client device including or connected to a display device can process speech data stored on storage devices local to the client device, e.g., received previously over communication networks.

Figure 2:
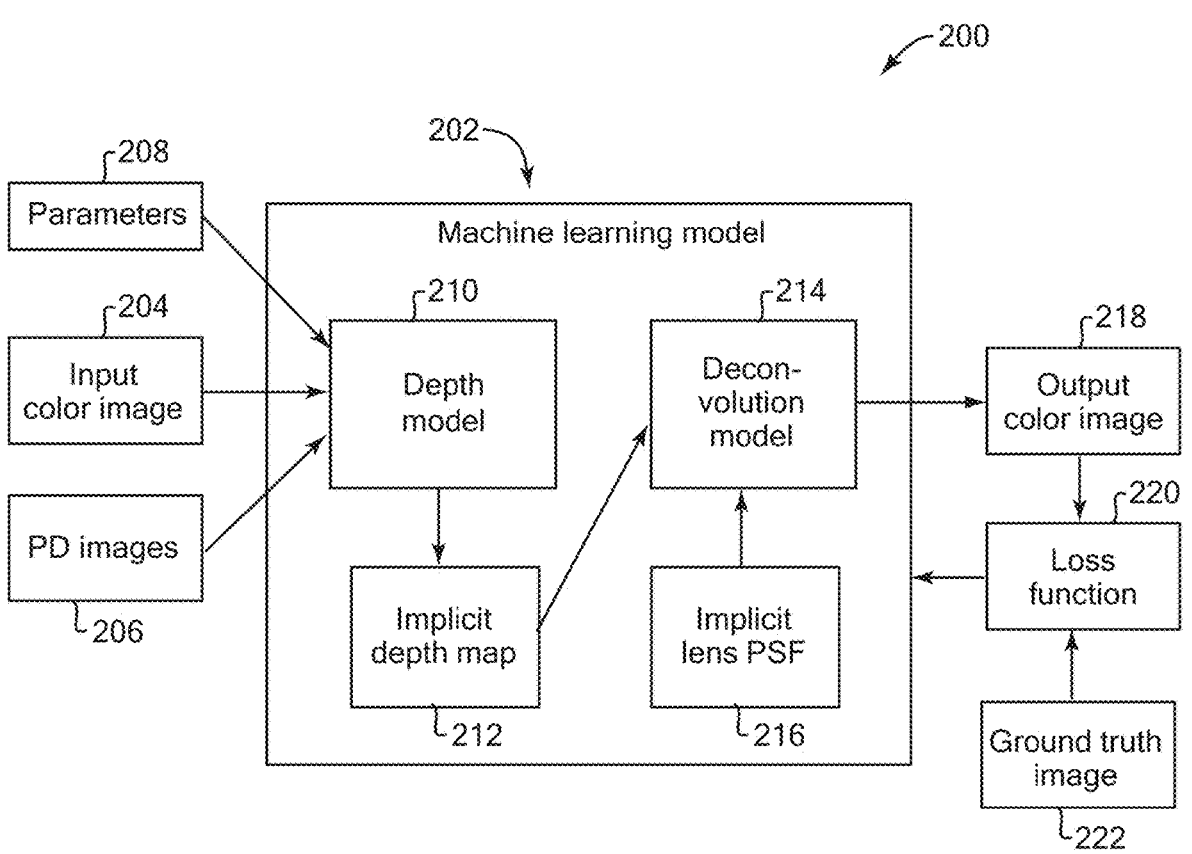
FIG. 2 is a block diagram illustrating an example machine learning model to modify depth of field in images, according to some implementations.

FIG. 2 is a block diagram illustrating a machine learning model 200 to modify depth of field in images, in accordance with some implementations. In some implementations, some or all of the system 200 can be implemented on one or more client devices 120, 122, 124, or 126 as shown in FIG. 1. In some implementations, system 200 can be implemented on one or more server devices, e.g., server system 102 of FIG. 1. In some implementations, system 200 can be implemented on both server device(s) and client device (e.g., some components on a client device and some components on a server device). In some implementations, system 200 can be implemented by image application 106 of FIG. 1 and/or hardware components of a device executing image application 106.

System 200 includes a machine learning model 202 that receives an input color image 204 (also referred to as input RGB image) and corresponding phase detection (PD) images 206 as inputs, and provides an output color image 218 (also referred to as output RGB image) as output. The input color image 204 can be any color image, such as an RGB image or other image of another color representation scheme. The input color image 204 can include an input depth of field, e.g., showing some areas of the image blurred according to that depth of field. PD images 206 depict the same scene as the input color image 204 and include a phase difference between them, e.g., different focus point positions. PD images of a scene are captured and analyzed by a camera so that autofocus features can determine if the scene is in focus and to adjust focus (if needed) and capture the associated color image. For example, cameras can include a dedicated phase detect autofocus sensor or phase detection autofocus pixels built into an image sensor, to provide PD images for a scene. For example, two PD images (e.g., left and right images) can be associated with the color image 204 and are provided as input to machine learning model 202.

In some implementations, the input color image 204 and PD images 206 are preprocessed into a suitable format before being input to the machine learning model 202. For example, preprocessing can include image manipulation including image bit depth conversion and field of view or pixel resolution matching between the color image and the associated PD images. In some implementations, a single captured PD image can be de-interleaved to create separate left and right subpixel images. The input color image and PD images are stacked to create a multi-channel image, such as a 5-channel image that includes three channels for red, green, and blue components of the color image and two channels for left and right PD images. The multi-channel image is then ready to be fed into the model 202.

Parameters 208 can also be input to the machine learning model 202 to instruct the model for the adjustment of depth of field for the input image 204. For example, parameters 208 can include a target depth of field for the output color image 218 that instructs the model 202 to adjust the depth of field of input color image 204 to simulate the target depth of field.

The output color image 218 is the output of the machine learning model 202 as a result of processing the input color image 204 and the input PD images 206. The output color image 218 includes the target depth of field that was specified in parameters 208 (or a default target depth of field if no such parameter is received).

In some implementations, a stream of input images 204 and PD images 206 can be input to the machine learning model 202, and a corresponding stream of output images 218 are output from the machine learning model. For example, a video having a sequence of images can be input, and a corresponding video is output that has adjusted depth of field. In some examples, the stream of output images can be displayed on a display screen of a camera as live preview images of the scenes in the field of view of the camera as the camera is moved or adjusted, and the depth of field is adjusted (e.g., in real time) in the preview images based on the target depth of field.

In some implementations, in the machine learning model 202, two machine learning sub-models or stages can be provided to process the input images 204 and 206, which are a depth model 210 and a deconvolution model 214. Depth model 210 performs feature matching and defocus estimation for the input color image 204 based on the PD images 206. In some examples, depth model 210 is a convolutional neural network (CNN). For example, a U-Net architecture can be used for depth model 210. Depth model 210 can include an encoder network that includes a series of convolutional layers, each followed by a pooling layer, which enables the extraction of high-level visual features depicted in the pixels of input color image 204 and predict depths in the input color image 204 based on the PD images 206. In some implementations, depending on how depth model 210 is trained, input parameters 208 may or may not be used by the model 210. For example, if depth model 210 is trained to support multiple levels of deblurring or depth of focus emulation, parameters 208 may be provided to the model as input.

The model can thus predict the depth information in the scene of the input RGB image 204, using a regression segmentation with continuous labels that represent the amount of depth in the scene, e.g., segmenting a continuous feature of depth. The PD images 206 provide additional information used to predict this depth information; for example, a phase difference between the two PD images indicates a distance and direction for the lens to be moved to bring the image into focus, and this information is used to imply depth. In some implementations, a CNN (such as U-Net) (trained for image segmentation tasks) can be modified to learn a mapping from a color image to a corresponding learned and estimated relative depth map. In some examples using a U-Net architecture, the U-Net model can be modified to be suitable to the present techniques. For example, the U-Net parameters can be modified so that the U-Net model accepts the 5-channel image described above, and outputs a 3-channel color (e.g., RGB) image. Internal model parameters of the U-Net model can be modified, e.g., downsampling depth, the number of filters used during each downsampling/upscaling step, etc. Such parameters may affect the resulting model size and speed of inference to provide the output color image 218 from the input image 210.

The output of depth model 210 can include an implicit depth map 212 that indicates the depths of the detected and segmented features in input color image 204. This implicit depth map is an implied matrix that is internal to machine learning model 202 (produced based on training) and is not externally accessible. The implicit depth map 212 serves as an input to deconvolution model 214.

The implicit depth map 212 derived by the depth model 210 is provided to deconvolution model 214. In addition, deconvolution model 214 is provided as input an implicit lens point spread function (PSF) 216. A PSF describes a characteristic of the lens of a camera that provide its blur characteristics and this function indicates the degree to which an optical system blurs a point of light. For example, the PSF function can be based on the camera used to capture input color image 204 and PD images 206. The implicit PSF function 216 and the implicit depth map 212 are implicitly learned within the machine learning model 202 by the deconvolution model 214 based on its training in conjunction with the depth model 210 using input color image 204 and PD images 206 as one set of many sets of training images, so that model 214 can deblur portions of the input image to adjust the depth of field in a corresponding output image. Some examples of training images are described below with respect to FIGS. 3 and 4. Deconvolution model 214 also receives parameters 208 including the target depth of field.

In some implementations, deconvolution model 214 is a decoder network that can include a convolutional neural network (CNN) model that operates in an inverse process of a convolution to deblur portions of the input image 204 to adjust the depth of field in a corresponding output image to obtain the target depth of field specified by parameters 208. For example, deconvolution model 214 can include a decoder network that includes transposed convolutional layers and upsampling layers, which can progressively reconstruct the relative implicit depth map at the output of the model 214. For example, deconvolution model 214 can include a standard type of CNN model architecture to provide progressive deconvolution or deblur. The deconvolution is based on the amount of defocus using the implicit relative depth map 212. Deconvolution model 214 can selectively deblur (or blur) areas of the input color image 204 to simulate a different depth of field (which would traditionally be the effect of capturing the image with a different-sized aperture than used for the actual capture of the image).

The output color image 218 is a blurred color image (e.g., RGB image) that corresponds to the input color image 204 but has different amounts and/or locations of blur within the image to simulate the target depth of field instead of the original depth of field of the input color image 204. For example, if the input color image 204 has a smaller depth of field and the output color image 218 has a larger depth of field, the parts of the image which were in focus in the input image remain in focus in the output image, and the parts of the input color image that are to have defocus blur (deblur) are progressively deblurred with respect to the depth of field distance (diopter distance) with respect to the focal plane of the input color image. The implicit depth map 212 is used in the deblurring, where the depth map 212 is relative to the in-focus regions of the image. Thus, the absolute value of the diopter distance in the relative depth map indicates the amount of deblur that is to be performed in the input color image.

In a training stage of the machine learning model 202, the value of a loss function 220 is computed based on a comparison of the output color image 218 and a ground truth image 222 for the target depth of field. Some examples of determining input training images and ground truth images such as ground truth image 222 are described below with reference to FIG. 3. The loss value based on differences between image 218 and ground truth image 222 is provided to model 202 to adjust one or more parameters and/or weights of the model 202 to reduce the loss. After inputting multiple training images and iteratively adjusting the model 202 (e.g., such training may be performed in epochs, with each epoch using a portion of the training dataset comprising training input images and corresponding groundtruth images), the machine learning model 202 is considered to be trained to adjust the blur in an input image to accurately simulate the target depth of field. In some implementations, model training can be based on a set of training images (e.g., 5,000 images; 10,000 images; 20,000 images; etc.) and can conclude when the model parameter adjustment has been performed utilizing a substantial portion of the training dataset. In some implementations, model training may be completed when a change in parameter values between consecutive epochs is below a threshold. In some implementations, model training may be completed when the loss value between consecutive epochs is below a threshold.

The models 210 and 214 are trained together, such that an implicit depth map is used within the ML model 202 and an explicit depth map for images is never created or used. This allows an input image to be input directly to the model during training and bypasses the requirement to provide explicit depth maps as model input, which saves processing and other computational resources, as well as making it possible for the ML model to manipulate DOF in a single color image provided as input.

FIG. 3 is a flow diagram illustrating an example method 300 to generate training images to train a machine learning model to adjust a depth of field in an image, according to some implementations. In some implementations, method 300 can be implemented, for example, by one or more client devices 120, 122, 124, or 126 as shown in FIG. 1. In some implementations, some or all of the method 300 can be implemented on one or more server systems 102 as shown in FIG. 1, and/or on both server device(s) and client device (s). In described examples, the implementing system includes one or more digital processors or processing circuitry ("processors"), and one or more storage devices (e.g., a database or other storage). In some implementations, different components of one or more servers and/or clients can perform different blocks or other parts of the method 300. Some implementations can have one or more blocks of method 300 performed by one or more other devices (e.g., other client devices or server devices) that can send results or data to a first device that performs other blocks.

Blocks of method 300 are only performed if permission is obtained by a user who originates the images processed by method 300.

Method 300 may begin at block 302. In block 302, images are obtained that depict multiple different scenes. The images have been captured by a camera at multiple different focus positions in focus stacks and at different distances between camera and scene. A "camera" as referred to herein can include any image capture device (e.g., dedicated camera device, a camera included in a smartphone or other device, etc.). The images include color images (e.g., RGB images) and associated phase detection (PD) images that correspond to the color images.

The scenes captured by the images can be of any content or type. In some examples, physical printouts depicting 2D scenes can be provided (e.g., physical photos), each printout depicting a different scene. A variety of different scenes may be provided in the printouts, such as a landscape of forests, a landscape of mountains, closeup views of various objects or textures, etc. Each scene is captured by a camera positioned at a stationary viewpoint head-on from the 2D scene.

The images depicting each scene of the physical printouts are captured using the camera at multiple different settings. These settings include different lens focus positions of the lens of the camera. For example, a focus sweep can be performed to provide multiple image captures of a scene, where the camera lens is positioned at multiple lens focus positions of the camera (while the camera is stationary) to capture a respective image at each focus position. In some implementations, for each scene, images are captured at the same lens positions and same number of lens positions. The focus sweep provides a focus stack of images at a particular depth distance of camera to scene. In some implementations, a focus stack can be determined as a subset of the images (e.g., consecutive images) captured in a focus sweep and can exclude other images captured in that focus sweep.

Furthermore, the different settings include different camera depth distances from the scene. For example, the camera is positioned at multiple different depth distances from the printout to capture a respective image at each depth distance. In some implementations, multiple images are captured in a focus sweep, and a respective focus sweep is performed at each of the depth distances of the camera to the scene, to provide focus sweeps at different depth distances.

In some implementations, the different settings can include the camera being positioned at different panning positions (e.g., left-right and up-down positions), so that different portions of the printout can be captured. Each panned position can be considered to be a different scene and can have its own set of images captured in association with that scene. Furthermore, different zoom levels can be used to capture different portions of each printout as respective scenes. This use of multiple scenes per printout allows a large variety of different images to be captured for each printout, thus reducing the number of printouts that have to be produced.

Each of the captured images can be a color image (e.g., RGB image), and for each color image, associated PD images are also captured by the camera for the scene depicted in the associated color image. For example, cameras commonly include an autofocus sensor that produces PD images, and two PD images (left and right PD images) can be captured for a scene which are typically used to autofocus the camera to capture the associated color image. Block 302 may be followed by block 304.

In block 304, a target depth of field is selected for input training images to be generated. In some implementations, the target depth of field can be selected based on a specified f-stop or aperture size of a camera. The selected target depth of field is chosen to simulate a particular aperture size for a simulated camera. For example, the target depth of field may be associated with a particular aperture size (e.g., f-stop) for the simulated camera. For example, the target depth of field has a particular diopter width associated with the particular aperture size based on the particular camera used to capture the images of block 302. The diopter width increases inversely proportionally to aperture size used by the camera. In some examples, the limits of the depth of field in images captured by a particular camera are a nearly constant distance apart in diopter width, regardless of the depth distance of the scene to the camera. Thus, average depth of field width can be plotted against aperture size for a given camera to provide a linear relationship. The linear relationship can be used to determine the target depth of field width for a particular aperture size. Block 304 may be followed by block 306.

In block 306, input compositions of particular images are generated, where the particular images are derived from particular focus stacks for different scenes. The input compositions may include an input image composition formed of particular color images, and also include multiple input PD compositions formed of corresponding PD images.

In some implementations, a particular lens focus position is determined (e.g., randomly) from the lens focus positions used to capture the particular focus stacks, and particular images are selected that have this same lens focus position, such that each particular image in the input image composition is captured at the same lens focus position. In some implementations, the particular images in the composition can be derived from the center image of their associated focus stack. For example, for some input image compositions, the particular focus stacks can each include a subset of images from the associated focus sweep such that a center image of the focus stack is captured at a lens focus position (e.g., has a focus depth or diopter) that is closest to a center of the depth of field among the images in that focus stack.

In some implementations, the particular image can be considered the sharpest image in the focus stack, e.g., has the sharpest focus.

For some input image compositions (e.g., multiple compositions generated in multiple iterations of method 300), the particular focus stacks can each include a subset of images from the associated focus sweep that is not centered on the center of the depth of field, and each particular image can be selected from such a particular focus stack (subset). In some implementations, multiple input image compositions generated by iterations of method 300 can each include a set of particular images that is from a different subset of focus stack images that are obtained from the associated focus sweep. For example, the different subsets can sample the entire range of images captured in the focus sweeps, e.g., in a uniform distribution or other distribution. In some examples, images captured at multiple (e.g., all) lens focus positions of a focus sweep can each be the particular image (e.g., center image) of a focus stack for a different input image composition. Such techniques can provide input image compositions that have different focus depths, which provides a variety of training images to enable the machine learning model 202 to simulate DOF adjustment for a variety of defocus levels and be exposed to a variety of images similar to real-world images.

In some implementations, at least two of the particular focus stacks are captured at different depth distances from the camera to the scene. In some implementations, each particular focus stack is captured at a different distance from the camera to the scene. In some examples, the particular focus stacks can be randomly selected from the focus stacks of block 302, such that multiple focus stacks include images captured at different distances from the camera to the scene. This provides particular images that have depths of field centered at different focus diopters (different depth distances). Each particular image is captured at the same lens position, and different particular images are captured at different distances from camera to scene, so that the composited image simulates a real 3D scene with varying depth.

The input image composition can be composed of the particular images that are at least a portion of the center images and are layered in the composition in layers having a layering order. In some implementations, the particular images layered in the input image composition can be cropped portions of the original particular images, and can be different sizes from other particular images in the input image composition. For example, this allows portions of larger images in lower layers to have portions displayed around the borders of smaller images on top of them in higher layers.

In some implementations, a random composition technique is used to construct the composition from the particular images. For example, the random composition technique can be a random occlusion-based composition technique. The composition technique adds particular images adjacent to and/or partially on top of other particular images in particular (e.g., random) locations within a border of the composition. Other random image composition techniques can be used in other implementations.

The layered images create a simulated 3D scene in the input image composition. The input image composition is composed of multiple particular images that were captured at different depth distances, thus providing different depths for the simulated 3D composition image.

Figure 4:
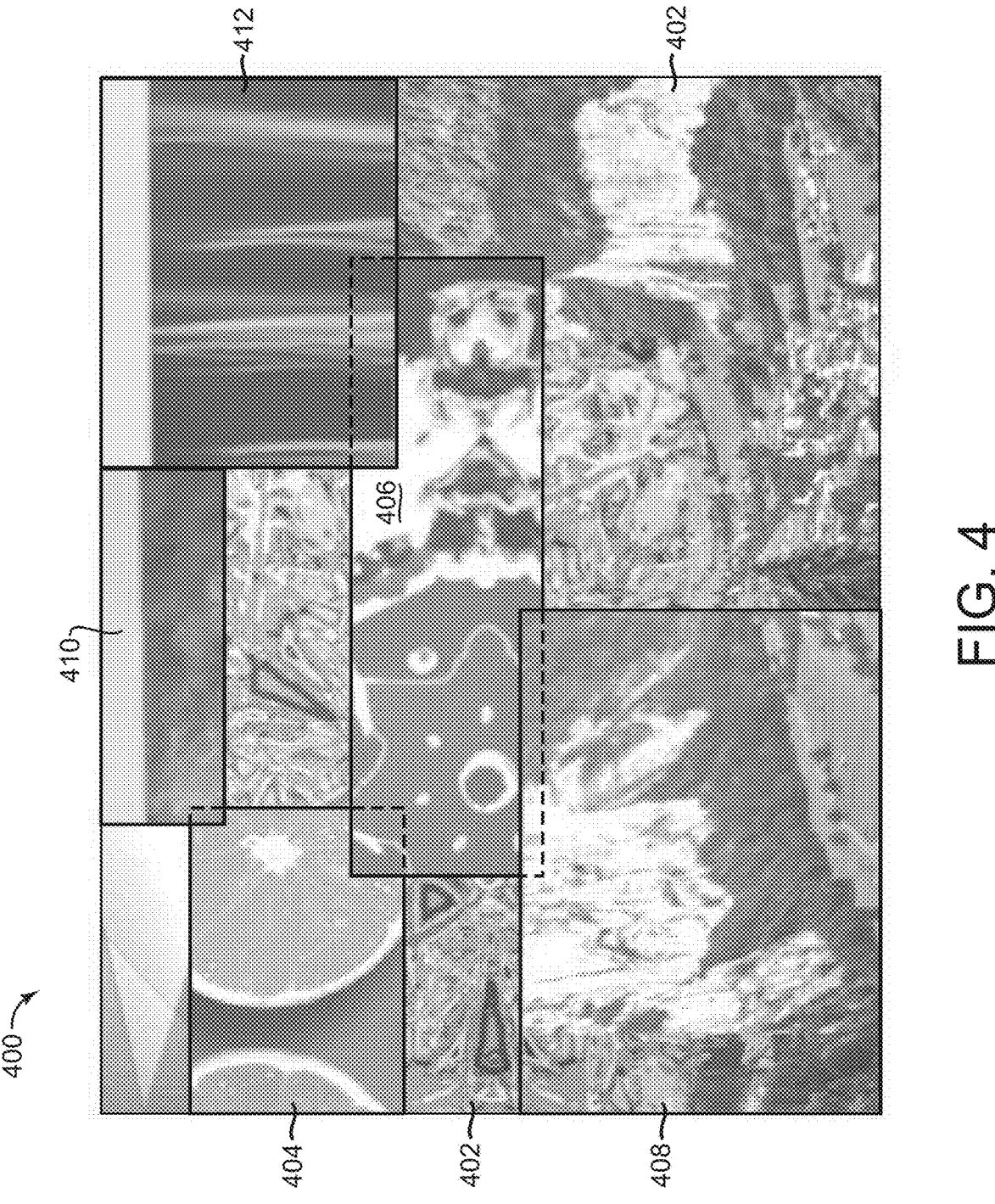
FIG. 4 is a diagram illustrating an example input image composition, according to some implementations.

FIG. 4 shows an example of an input image composition 400, in which several particular images are cropped images placed in layers (the particular images are shown in greyscale and represent images that are in color). Various particular images are partially covering other particular images in layers below them and/or are partially covered by other particular images in layers above them in the order of layering. For example, image 402 can be a large image that covers all or most of the area of composition 400 and is at a low or bottom layer. Other, smaller images in composition 400 overlap image 402 and may overlap other images at lower layers. For example, image 404 is smaller than and overlaps part of image 402. Image 406 is at a higher layer and overlaps images 402 and 404. Images 408, 410, and 412 are at even higher layers and overlap images 402, 404, and/or 406. In addition, the particular images of composition 400 have a variety of different subject matter captured at different distances. For example, image 404 shows subject matter captured at a close distance while images 402 and 408 show subject matter captured at a far distance.

Corresponding PD images (described below) are also generated (not shown) that have the same layout and layering of PD images to the corresponding particular images in input image composition 400. A ground truth composition (described below, not shown) is generated based on input image composition 400 and has the same layout and layering of images as the particular images in composition 400, and the particular images are replaced with corresponding merged images that have an adjusted depth of field.

Referring back to FIG. 3, one or more characteristics of the composition generation can be randomized. For example, the image mask shape (e.g., the size and shape of each crop of the original image to create a particular image that is a cropped version of an original image) can be randomized. The spatial location of the crop on the original image, and/or the location within the composition border can be randomized. The number of particular images included in the input image composition can be randomized. The sequence order of layering the particular images in the input image composition can be randomized.

A variety of scenes are created by randomizing the order of the layering and other characteristics. In some implementations, due to these randomizations, large amounts of variation is generated in different input image compositions based on a limited selection of images.

Input PD compositions are also generated, and are formed similarly to the input image composition described above. A PD composition includes PD images that are associated with the particular images used in the above input image composition. For example, PD images are cropped as the same size of the associated particular images and are cropped at locations of the PD composition that correspond to the locations in the input images to form the particular image. In some examples, a left PD composition and a right PD composition can be generated. Block 306 may be followed by block 308.

In block 308, the compositions (including the input image composition and the input PD compositions) are provided as input training images associated with the target depth of field, and can be input to the machine learning model 200 as a training input image, as described below with reference to FIG. 6. Block 308 may be followed by block 310.

In blocks 310-314, a ground truth image is generated that corresponds to the input images generated in blocks 306-308 and can be used as ground truth data for the input color image being modified to have the target depth of field.

In block 310, distortion is adjusted in one or more images of each particular focus stack to match the distortion in the particular image of the respective focus stack. As described above, the center image in a focus stack has a focus distance or diopter that is closest to the center of the depth of field among the images in the focus stack and can be considered the sharpest image in the focus stack. For example, the distortion adjustment accounts for focus breathing and lens distortion changes with respect to focus distance (e.g., edge and distortion effects). For example, the images within a focus stack (except for the particular image) can be warped using feature-matching homography. This causes the lens distortion and field of view of each image in a focus stack to be about the same, allowing a more precise transfer of detail from one image to another image in a merge operation (described below) compared to merging without the distortion adjustment. For example, vision algorithms such as homography from feature matching and perspective warping can be used.

In some implementations, the warping includes making the images in each focus stack have a perspective that is the same as or similar to the particular image in that focus stack. For example, in some implementations, all other images in the focus stack are homography-matched to the particular image, and a transformation matrix is calculated. This transformation matrix is then used to warp the perspectives of all the other images in the focus stack to the particular image. In other implementations, the distortion adjustment of block 310 can be omitted. Block 310 may be followed by block 312.

In block 312, a merged image is determined in each particular focus stack of images for each scene of the input image composition, by merging the warped images of block 310 within each focus stack based on the target depth of field. For example, multiple images in each focus stack are merged using focus stacking techniques. These images have been warped in block 312 and thus are corrected for any differences in distortion and/or field of view within a focus stack. The resulting merged image has a different depth of field than any of the individual images based on the combination of depths of fields of the merged images. This allows a depth of field to be increased by merging images in a focus stack that have depths of fields centered at different distances to the camera.

Figure 5A:
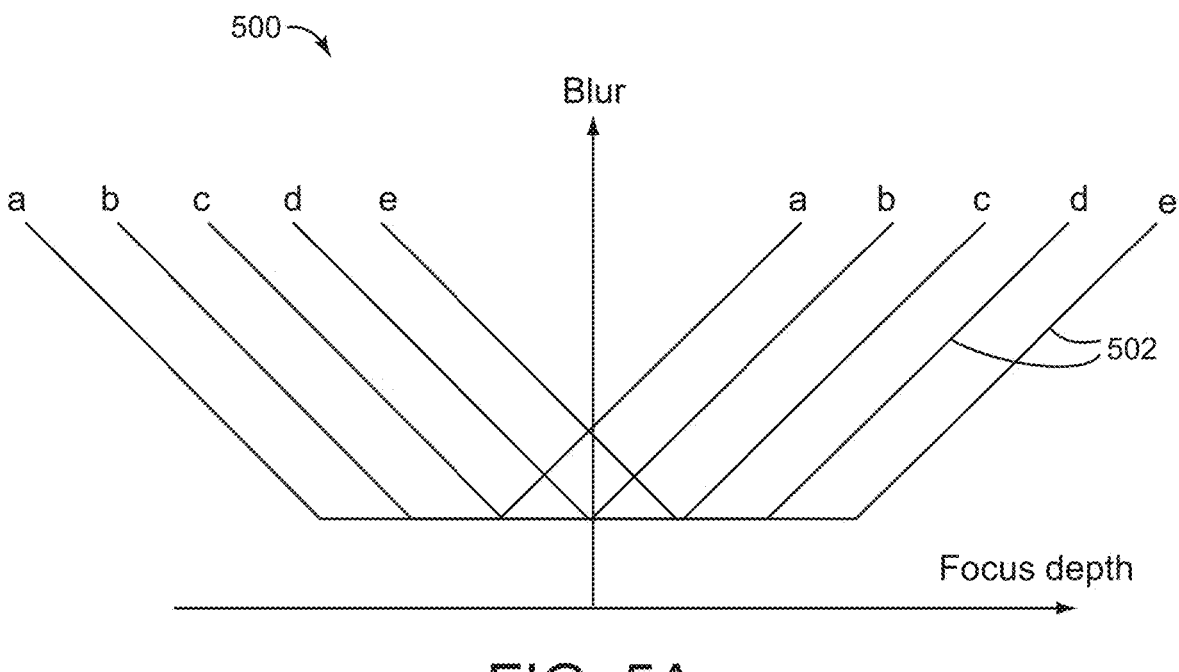
FIGS. 5A-5B are diagrams illustrating merging of images in a focus stack to obtain a merged image, according to some implementations.

FIG. 5A illustrates an example graph 500 of the depth of field of individual images of a focus stack, captured consecutively in a single focus sweep, e.g., images captured at consecutive different lens focus positions of a camera. The graph shows curves 502 for individual images that indicate an amount of blur in the image (vertical axis) vs. the focus depth (focus diopter or distance to camera), where the position of the vertical axis indicates the desired center of the target depth of field along the horizontal axis. Images a, b, c, d, and e each have an amount of blur that decreases (at the same rate in each curve) as the distance to camera changes toward the center of the depth of field of that image, where the horizontal portion at the bottom of each curve 502 indicates the distances within the depth of field for that image, at which blur is lowest and focus is greatest. By successively changing the lens position for images a-e, the shape of the curves 502 do not change, and only shift on the horizontal distance axis; each curve shows a depth of field at a different distance, and many of the depths of field overlap. Image c is the center image that has a focus position such that its depth of field is centered at the focal distance of the desired target depth of field, in the center of the images in the focus stack.

Figure 5B:
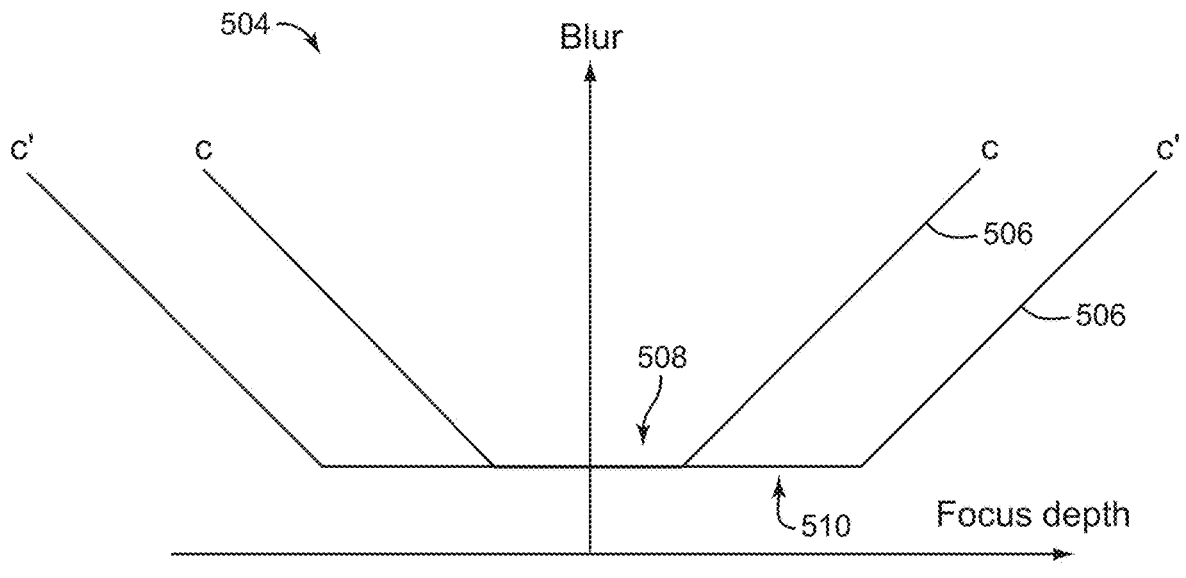

FIG. 5B illustrates an example graph 504 showing curves 506 for a merged image, after the images a-e of FIG. 5A have been merged, e.g., using one or more focus stacking techniques as described for block 312. The merged image c' is the resulting image after the merge, which has an extended depth of field compared to original center image c. For example, focus region 508 of the merged image c' is the same focus region as in image c, but focus region 510 of the merged image c' (horizontal portion of the curve) is in focus in the merged image and is not in focus in image c, thus increasing the depth of field in image c' compared to image c.

Referring back to FIG. 3, a merged color image is provided for each particular focus stack in the input image composition.

The above-described techniques preserve the image with the sharpest focus within a focus stack and create a merged image that has an extended or enlarged depth of field compared to the input image. The merged image is used to train a machine learning model to extend the depth of field of an input image. In some implementations or cases, the merged image can be provided with a smaller depth of field than the depth of field in the images in the input image composition, to train a machine learning model to reduce the depth of field of an input image. In some implementations, to train a model to generate a smaller or reduced depth of field, the focus stacking described above can instead preserve the image of a focus stack that has the blurriest focus, and the other images in the focus stack can be warped to the image with the blurriest scene similarly as described above for the sharpest focus. Other techniques can also be used, e.g., mimicking defocus blur with convolution based on depth information. Block 312 may be followed by block 314.

In block 314, a ground truth composition of merged color images from each of the particular focus stacks of images is generated. The ground truth composition is a ground truth image for the target depth of field. The merged images each have an adjusted depth of field via a stacking operation as described above. The ground truth composition can be a group of the merged images that are layered in the composition in the same layering order as in the input image composition. Similarly to the particular images of input image composition, the merged images in the composition are cropped portions of original images and portions of images at lower layers may be displayed around borders of images in higher layers.

For example, one or more image composition techniques can be used to generate the ground truth composition as described for block 306. The ground truth composition is generated using the same technique(s), parameters, and randomization characteristics used to generate the input image composition as described above for block 306. This causes the ground truth composition to have the same layout as the input image composition, e.g., corresponding portions of images spatially arranged in the same layers and positions, except for the use of corresponding merged images that have the target depth of field instead of the particular images used in the input image composition. The merged image composition provides ground truth data using in training a machine learning model to adjusting an input image to have the target depth of field. During training of the machine learning model, the ground truth composition is compared to an output color image of the machine learning model, as described below with reference to FIG. 6.

Method 300 can be performed additional times to generate different input training images (including PD training images) as well as associated ground truth images for the target depth field. Method 300 can also be performed to generate input training images and ground truth images for other target depths of field, such that a set of input training images and ground truth images is stored and available for each of multiple different target depths of field.

The techniques described above enable generation of a large and diverse dataset of training images with varying depths of field, scene variety, and composition, which facilitates the training of the machine learning model and generalizes well to real-world scenes. In some examples, a dataset of 5,000 to 10,000 (or more) training images can be generated from a much smaller set of physical photos, e.g., by capturing different portions of the physical photos, etc. These techniques are useful since previous methods of capturing a large dataset of natural 3D scenes takes a prohibitive amount of time. Furthermore, rendering-based synthesis of such a dataset introduces errors based on the accuracy of the 3D rendering and the optical simulation used to recreate a real image coming from the camera system. Since the described techniques can use real-world images captured with a real camera system as a source to synthesize 3D scenes, the optical accuracy is preserved.

FIG. 6 is a flow diagram illustrating a method 600 to adjust a depth of field in an image using a machine learning model, according to some implementations. In some implementations, method 600 can be implemented, for example, by one or more client devices 120, 122, 124, or 126 as shown in FIG. 1. In some implementations, some or all of the method 600 can be implemented on one or more server systems 102 as shown in FIG. 1, and/or on both server device(s) and client device(s). In described examples, the implementing system includes one or more digital processors or processing circuitry ("processors"), and one or more storage devices (e.g., a database or other storage). In some implementations, different components of one or more servers and/or clients can perform different blocks or other parts of the method 600. Some implementations can have one or more blocks of method 600 performed by one or more other devices (e.g., other client devices or server devices) that can send results or data to a first device that performs other blocks.

Implementations discussed herein do not require collection or usage of user personal information. For example, images captured on a portable device can be processed by method 600 at the portable device without collection or usage or storage of user personal information, and without transmission of user images or other user data to server systems. In situations in which certain implementations discussed herein may collect or use personal information about users, users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. Each user for which personal information is to be collected is presented with one or more options to allow control over the information collection relevant to that user, to provide permission or authorization as to whether the information is collected and as to which portions of the information are to be collected. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Blocks of method 600 are only performed if permission is obtained by a user who originates the images processed by method 600.

In some implementations, method 600, or portions of the method, can be initiated automatically by a system. For example, the method (or portions thereof) can be performed based on one or more particular events or conditions, e.g., reception of images by a device, and/or one or more other conditions occurring which can be specified in device settings.

Method 600 may begin at block 602. In block 602, input images are received to a machine learning model, where the input images have an input depth of field. The input images include an input color image and multiple input PD images (e.g., left and right PD images).

The machine learning model is configured to adjust the depth of field of the input color image. In a training stage of the machine learning model, the input images are input training images that are used to train the machine learning model. For example, the input image composition and input PD images generated in method 300 can be provided as input training images.

In a later inference stage of the machine learning model, the input images are new images that are to be processed by the machine learning model to generate an output color image that has a target depth of field. In some examples of the inference stage, the input images (including color image and PD images) can be received from a user who inputs or uploads the images, can be received from a camera that has captured the input images, or the input images can be received from a connected device, e.g., over a network. In some examples of the inference stage, the input images can be received in an application program or other program executing on a device, such as an image editing application, and the application program provides the input images to the machine learning model. Block 602 may be followed by block 604.

In block 604, parameters are received by the machine learning model for the processing of the input images, where the parameters indicate a target depth of field for the output image. The machine learning model is to adjust the input depth of field of the input color image to obtain the target depth of field in an output color image that corresponds to the input color image (e.g., the output color image has the same field of view, depicted subject matter, colors, etc. as the input color image).

In some implementations, the target depth of field can be included in the input parameters, or can be determined by a system based on the input parameters. For example, a f-stop, aperture size, or other parameter can be specified or indicated in received input data, and the target depth of field determined based on those parameters, similarly as described for block 304 of FIG. 3. In some implementations, an input device can be used to provide user input that is indicative the target depth of field. In some implementations, the input device can be a display screen of a device, e.g., a user interface menu allowing aperture selection or specification, direct selection of aperture, desired depth of field, or other parameters by tap input on portions of the image displayed on the screen, etc. Block 604 may be followed by block 606.

In block 606, the input images are processed in a depth CNN stage of the machine learning model to determine an implicit depth estimation for features of the input images. For example, image features are detected such as objects (e.g., persons, items, etc.), landscape features, etc. that are depicted in the pixels of the input mages, and the depths of such features are estimated. For example, depth model 210 of FIG. 2 can be used as this stage to predict the depth information in the scene of the input images. Block 606 may be followed by block 608.

In block 608, the input images and the implicit depth estimate from block 606 are processed in a deconvolution CNN stage of the machine learning model to adjust the blur in pixels of the input color image to simulate the target depth of field. For example, deconvolution model 214 of FIG. 2 can be used as this stage to selectively blur or deblur areas of the input RGB image to simulate a different depth of field. Block 608 may be followed by block 610.

In block 610, an output color image is provided from the deconvolution CNN that is the input color image with adjusted blur in particular pixels such that it depicts the target depth of field centered around the focal plane of the input image. In the case of the current processing being in a training stage, the output color image is an output image composition that includes particular images in the same layout and having the same occlusion of the input composition image as described above (and the particular images in the composition can be captured at the same focus lens position as described above). For example, regions of an input color image that were originally blurred and are now within an extended depth of field are deblurred proportionally to the amount of original blur, and no deblurring or very small deblurring is applied in sharp regions of the input color image. Block 610 may be followed by block 612.

In block 612, it is determined whether the current processing of method 600 is in the training stage of the machine learning model such that the input images are input training images. If it is not the training stage, then the input images are new input images and the method proceeds to block 614 in which the output image is provided for use, e.g., saved in storage, transmitted to another device, displayed by an image application on a display device such as a display screen, etc. In some implementations, the output image can be cropped, resized, sharpened, and/or otherwise processed as needed.

For example, in some implementations, a system (e.g., device) includes (or is in communication with) a camera that captures the input image and the captured input image is processed by the system as described above (with one or more input parameters such as target depth of field) to provide an output image. In some implementations, the camera includes a display screen, and the output image is caused to be displayed on the display screen, e.g., as a preview image in a digital viewfinder of the camera before the user selects a shutter button to capture and store the image shown by the display screen. There may be a delay between capturing the input image and causing the output image to be displayed, e.g., caused by the processing of method 600. This delay can be less than a time threshold such that the output image is displayed on the display screen substantially in real-time after being captured in the current field of view of the camera lens. This display of an output image can be performed for a stream of input images input and processed by method 600, e.g., displayed as a digital viewfinder previews. Such displays can achieve a level of depth of field extension or reduction to mimic a traditional depth of field manipulation via variable aperture size.

If it is the training stage of the machine learning model, then the input images are training input images and the method proceeds from block 612 to block 616, in which the output image (e.g., as an output training image) is used to update and train the machine learning model. The output image is compared to the associated ground truth image that corresponds to the input color image (e.g., a ground truth composition as generated by method 300 of FIG. 3), and training losses and metrics (e.g., a loss value) are determined. For example, a loss function or error function can be used that is a combination of an L1 loss function (e.g., mean absolute error) and a gradient-L1 loss function (e.g., L1 loss of gradient images). For example, the losses from these two loss functions can be averaged to obtain a combined loss as the loss value. The loss function provides quantifiable metrics that are used to evaluate how close the output image is to the ground truth image, and the loss value is used to adjust parameters and weights of the machine learning model as needed. For example, a backpropagation algorithm can use the loss function to iteratively adjust the model's parameters and reduce (e.g., minimize) the loss value of the loss function, thus providing output images closer to the ground truth image. This allows the machine learning model to learn the structure and texture of the ground truth image. For example, the method 600 can return to block 602 to process the same or other training input images for training the machine learning model.

In various implementations, various blocks of methods 300 and/or 600 may be combined, split into multiple blocks, performed in parallel, or performed asynchronously. In some implementations, one or more blocks of method 300 or 600 may not be performed or may be performed in a different order than shown in FIGS. 3 and 6. Method 300 or 600, or portions thereof, may be repeated any number of times using additional inputs, e.g., additional images are received.

Figure 7:
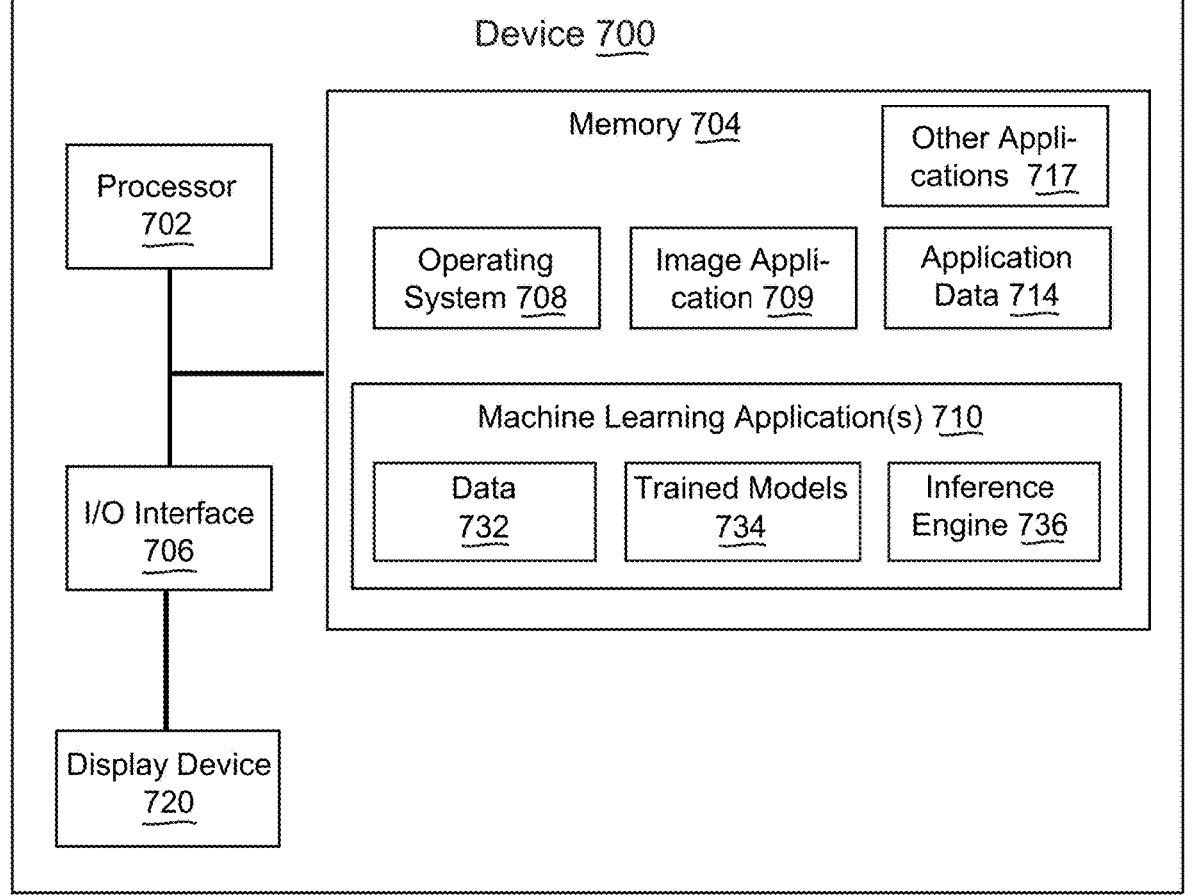
FIG. 7 is a block diagram of an example computing device which may be used to implement one or more features described herein.

FIG. 7 is a block diagram of an example device 700 which may be used to implement one or more features described herein. In some examples, device 700 may be used to implement a client device, e.g., any of client devices 120-126 and 140 shown in FIG. 1. The device 700 may for example be advantageously embodied in a client device, such as a smartphone, personal computer, headphones, or PDA. In some implementations, the trained machine learning model described herein can be integrated into a mobile application for real-time depth of field adjustment on mobile devices. Alternatively, device 700 can implement a server device, e.g., server device 104. In some implementations, device 700 may be used to implement a client device, a server device, or both client and server devices. Device 700 can be any suitable computer system, server, or other electronic or hardware device as described above.

One or more methods described herein can operate in several environments and platforms, e.g., as a standalone computer program that can be executed on any type of computing device, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.), a program run on a web browser, etc. In one example, all computations can be performed within the mobile app (and/or other apps) on the mobile computing device. In another example, a client/server architecture can be used, e.g., a mobile computing device (as a client device) sends input data (e.g., images and parameters) to a server device and receives from the server the final output data (e.g., image data to be output by a display device of the client device). In another example, computations can be split between the client device and one or more server devices.

In some implementations, device 700 includes a processor 702, a memory 704, and input/output (I/O) interface 706. Processor 702 can be one or more processors and/or processing circuits to execute program code and control basic operations of the device 700. A "processor" includes any suitable hardware system, mechanism or component that processes data, signals or other information. A processor may include a system with a general-purpose central processing unit (CPU) with one or more cores (e.g., in a single-core, dual-core, or multicore configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some implementations, processor 702 may include one or more co-processors that implement neural-network processing. In some implementations, processor 702 may be a processor that processes data to produce probabilistic output, e.g., the output produced by processor 702 may be imprecise or may be accurate within a range from an expected output. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 704 is typically provided in device 700 for access by the processor 702, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 702 and/or integrated therewith. Memory 704 can store software operating on the server device 700 by the processor 702, including an operating system 708, image application 709 (e.g., which may be the same as image application 106 of FIG. 1), machine learning application(s) 710 (which may be part of or interface with machine learning models as described herein), other applications 712, and application data 714. Other applications 712 may include applications such as a data display engine, image display engine, notification engine, social networking engine, media display applications, communication applications, web hosting engines or applications, media sharing applications, etc. In some implementations, image application 709 and/or machine learning application(s) 710 can include instructions that enable processor 702 to perform functions described herein, e.g., some or all of blocks of system 200 of FIG. 2, method 300 of FIG. 3, and/or method 600 of FIG. 6. In some implementations, image data received from users or devices can be stored as application data 714 or other data in memory 704, and/or on other storage devices of one or more other devices in communication with device 700.

Any of software in memory 704 can alternatively be stored on any other suitable storage location or computer-readable medium. In addition, memory 704 (and/or other connected storage device(s)) can store one or more messages, user preferences, one or more taxonomies, electronic encyclopedia, dictionaries, digital maps, knowledge bases, grammars, and/or instructions and data used in the features described herein. Memory 704 and any other type of storage (magnetic disk, optical disk, magnetic tape, or other tangible media) can be considered "storage" or "storage devices."

I/O interface 706 can provide functions to enable interfacing device 700 with other systems and devices. Interfaced devices can be included as part of the device 700 or can be separate and communicate with the device 700. For example, network communication devices, storage devices (e.g., memory and/or database), and input/output devices can communicate via I/O interface 706. In some implementations, the I/O interface can connect to interface devices such as input devices (keyboard, pointing device, touchscreen, microphone, camera, scanner, sensors, etc.) and/or output devices (display devices, speaker devices, printers, motors, etc.). In some implementations, hardware used for components of system 200 of FIG. 2 can be included in I/O interface or other connected components of device 700.

Some examples of interfaced devices that can connect to I/O interface 706 can include one or more microphones that can be used to capture audio, and speakers that can output audio based on audio data. The I/O interface 706 can interface to other input and output devices such as one or more cameras which can capture images and/or detect gestures, e.g., provide captured input images to machine learning application 710 to adjust depth of field. Other input and output devices can include sensors for detecting gestures, global positioning sensors (GPS), etc. One or more display devices 720 can be used to display content, e.g., images, video, and/or a user interface of an application. Display device 720 can be connected to device 700 via local connections (e.g., display bus) and/or via networked connections and can be any suitable display device. Display device 720 can include any suitable display device such as an LCD, LED, or plasma display screen, CRT, television, monitor, touchscreen, 3-D display screen, or other visual display device. Display device 720 may also act as an input device, e.g., a touchscreen input device. For example, display device 720 can be a flat display screen provided on a mobile device, multiple display screens provided in glasses or a headset device, or a monitor screen for a computer device.

In various implementations, machine learning application 710 may utilize Bayesian classifiers, support vector machines, neural networks, or other learning features and techniques. In some implementations, machine learning application 710 may include one or more trained models 734, an inference engine 736, and data 732. In some implementations, data 732 may include training data, e.g., data used to generate trained model(s) 734. For example, training data may include training image compositions as described herein, and/or other training images (including videos).

Training data may be obtained from any source, e.g., a data repository specifically marked for training, data for which permission is provided for use as training data for machine-learning, etc. In implementations where one or more users permit use of their respective user data to train a machine-learning model, e.g., trained model 734, training data may include such user data. In implementations where users permit use of their respective user data, data 732 may include permitted data such as images, videos, or other user-generated image data.

In some implementations, training data may include synthetic data generated for the purpose of training, such as data that is not based on user input or activity in the context that is being trained, e.g., data generated from physical photos or printouts as described herein, and/or other computer-generated images. In some implementations, machine learning application 710 excludes data 732. For example, in these implementations, the trained model 734 may be generated, e.g., on a different device, and be provided as part of machine learning application 710. In various implementations, the trained model 734 may be provided as a data file that includes a model structure or form, and associated weights. Inference engine 736 may read the data file for trained model 734 and implement a neural network with node connectivity, layers, and weights based on the model structure or form specified in trained model 734.

In some implementations, a trained model 734 may include one or more model forms or structures. For example, model forms or structures can include one or more CNNs as described herein (e.g., a network that splits or partitions input data into multiple parts or tiles, processes each tile separately using one or more neural-network layers, and aggregates the results from the processing of each tile), or alternatively any type of neural-network, such as a linear network, a deep neural network that implements a plurality of layers (e.g., "hidden layers" between an input layer and an output layer, with each layer being a linear network), a long short term memory (LTSM) network, a sequence-to-sequence neural network (e.g., a network that takes as input sequential data, such as words in a sentence, frames in a video, etc. and produces as output a result sequence), etc. The model form or structure may specify connectivity between various nodes and organization of nodes into layers.

For example, the nodes of a first layer (e.g., input layer) may receive data as input data 732 or application data 714. Subsequent intermediate layers may receive as input output of nodes of a previous layer per the connectivity specified in the model form or structure. These layers may also be referred to as hidden layers or latent layers. A final layer (e.g., output layer) produces an output of the machine learning application. For example, the output may be a depth map, an output color image, etc. as described herein. In some implementations, model form or structure also specifies a number and/or type of nodes in each layer.

In different implementations, trained model 734 can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in video, etc.

In some implementations, a trained model 734 may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 732, to produce a result.

For example, training may include applying supervised learning techniques. In supervised learning, the training data can include a plurality of inputs (e.g., a set of images) and a corresponding expected output for each input (e.g., a set of groundtruth labels indicating features and/or depth in each image in the set of images). Based on a comparison of the output of the model with the expected output (e.g., ground truth images), values of the weights are automatically adjusted, e.g., in a manner that increases a probability that the model produces the expected output when provided similar input.

Machine learning application 710 also includes an inference engine 736. Inference engine 736 is configured to apply the trained model 734 to data, such as application data 714, to provide an inference. In some implementations, inference engine 736 may include software code to be executed by processor 702. In some implementations, inference engine 736 may specify circuit configuration (e.g., for a programmable processor, for a field programmable gate array (FPGA), etc.) enabling processor 702 to apply the trained model. In some implementations, inference engine 736 may include software instructions, hardware instructions, or a combination. In some implementations, inference engine 736 may offer an application programming interface (API) that can be used by operating system 710 and/or other applications 712 to invoke inference engine 736, e.g., to apply trained model 734 to application data 714 to generate an inference. For example, the inference for a machine learning model may be an output image having an adjusted depth of field based on an input target depth of field.

Machine learning application(s) 710 may provide several technical advantages. For example, when trained model 734 is generated based on unsupervised learning, trained model 734 can be applied by inference engine 736 to produce knowledge representations (e.g., numeric representations) from input data, e.g., application data 714. For example, a model trained for images may produce representations of images that have a smaller data size than input data. In some implementations, such representations may be helpful to reduce processing cost (e.g., computational cost, memory usage, etc.) to generate an output (e.g., an image, a label, a classification, etc.). In some implementations, such representations may be provided as input to a different machine learning application that produces output from the output of inference engine 736. In some implementations, knowledge representations generated by machine learning application 710 may be provided to a different device that conducts further processing, e.g., over a network. In such implementations, providing the knowledge representations rather than the speech data may provide a technical benefit, e.g., enable faster data transmission with reduced cost.

In some implementations, a machine learning application 710 may be implemented in an offline manner. In these implementations, trained model 734 may be generated in a first stage, and provided as part of machine learning application 710. In some implementations, machine learning application 710 may be implemented in an online manner. For example, in such implementations, an application that invokes machine learning application 710 (e.g., operating system 710, image application 709, or one or more of other applications 712) may utilize an inference produced by machine learning application 710, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained model 734, e.g., to update embeddings for trained model 734.

In some implementations, machine learning application 710 may be implemented in a manner that can adapt to particular configuration of device 700 on which the machine learning application 710 is executed. For example, machine learning application 710 may determine a computational graph that utilizes available computational resources, e.g., processor 702. For example, if machine learning application 710 is implemented as a distributed application on multiple devices, machine learning application 710 may determine computations to be carried out on individual devices in a manner that optimizes computation. In another example, machine learning application 710 may determine that processor 702 includes a GPU with a particular number of GPU cores (e.g., 1000) and implement the inference engine accordingly (e.g., as 1000 individual processes or threads).

In some implementations, machine learning application 710 may implement an ensemble of trained models. For example, trained model 734 may include a plurality of trained models that are each applicable to the same input data. In these implementations, machine learning application 710 may choose a particular trained model, e.g., based on available computational resources, success rate with prior inferences, etc. In some implementations, machine learning application 710 may execute inference engine 736 such that a plurality of trained models is applied. In these implementations, machine learning application 710 may combine outputs from applying individual models, e.g., using a voting-technique that scores individual outputs from applying each trained model, or by choosing one or more particular outputs. Further, in these implementations, machine learning application 710 may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine learning application, e.g., by operating system 710 or one or more applications 712.

In different implementations, machine learning application 710 can produce different types of outputs. For example, machine learning application 710 can provide representations or clusters (e.g., numeric representations of input data), image data (e.g., with blur or without), etc. In some implementations, machine learning application 710 may produce an output based on a format specified by an invoking application, e.g., operating system 710 or one or more applications 712. In some implementations, an invoking application may be another machine learning application. For example, such configurations may be used in generative adversarial networks, where an invoking machine learning application is trained using output from machine learning application 710 and vice-versa.

Any of software in memory 704 can alternatively be stored on any other suitable storage location or computer-readable medium. Memory 704 and any other type of storage (magnetic disk, optical disk, magnetic tape, or other tangible media) can be considered "storage" or "storage devices."

For ease of illustration, FIG. 7 shows one block for each of processor 702, memory 704, I/O interface 706, and software blocks 708-714 and 732-736. These blocks may represent one or more processors or processing circuitries, operating systems, memories, I/O interfaces, applications, and/or software modules. In other implementations, device 700 may not have all of the components shown and/or may have other elements including other types of elements instead of, or in addition to, those shown herein. While some components are described as performing blocks and operations as described in some implementations herein, any suitable component or combination of components of environment 100, device 700, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer-readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

In situations in which certain implementations discussed herein may collect or use personal information about users (e.g., user data, such as speech data and other data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user device's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method comprising:

obtaining a plurality of images captured with a camera, each image depicting a respective scene of a plurality of scenes, wherein for each scene, multiple focus stacks of images are captured, wherein individual images in each focus stack are captured at a respective lens focus position of a plurality of lens focus positions of the camera, and wherein individual focus stacks of the multiple focus stacks for the scene are captured at a respective distance of a plurality of distances of the camera to the scene;

selecting a target depth of field that is associated with a particular f-stop of a simulated camera;

generating, by one or more processors, an input training image that is an input image composition of particular images that are at least portions of the plurality of images, wherein each of the particular images is from a respective particular focus stack of the multiple focus stacks for a different scene of the plurality of scenes;

determining, by the one or more processors, a merged image for each particular focus stack, wherein determining the merged image is based on, for each particular focus stack, merging two or more images in the particular focus stack in a focus stacking operation based on the target depth of field to determine the merged image for the particular focus stack;

generating, by the one or more processors, a ground truth image that is a ground truth composition of the merged images, wherein the ground truth composition corresponds to the input image composition;

providing the input training image and the target depth of field as inputs to a convolutional neural network (CNN) machine learning (ML) model;

outputting, by the CNN ML model, an output image, wherein the output image is obtained by adjusting blurriness in the input training image to obtain the target depth of field; and updating, by the one or more processors, the CNN ML model based on a loss value determined based on comparison of the output image and the ground truth image, wherein the updating comprises adjusting one or more parameters of the CNN ML model based on the loss value.

2. The computer-implemented method of claim 1, wherein the plurality of images are color images, and further comprising:

generating a plurality of input phase difference (PD) image compositions that correspond to the input image composition, wherein each input PD image composition includes a plurality of PD images that correspond to the particular images of the input image composition; and providing the plurality of input PD image compositions as input to the CNN ML model.

3. The computer-implemented method of claim 2, wherein the CNN machine learning model includes:

a depth convolutional neural network (CNN) configured to determine an implicit depth estimation for depicted features of the input image composition based on the input PD image compositions; and a deconvolution CNN configured to receive the input image composition from the depth CNN, adjust blur in the input image composition based on the implicit depth estimation and based on the target depth of field, and output the output image.

4. The computer-implemented method of claim 1, wherein determining the merged image for each particular focus stack includes, for each of the particular focus stacks, prior to merging the two or more images, adjusting distortion of one or more images in the particular focus stack such that all the images in the particular focus stack are matched in distortion to the particular image of the particular focus stack.

5. The computer-implemented method of claim 4, wherein adjusting the distortion is based on a feature-matching homography technique that matches features of the one or more images to the particular image of the focus stack.

6. The computer-implemented method of claim 1, further comprising, prior to generating the input training image, randomly selecting the particular focus stacks from the plurality of images such that multiple focus stacks include images captured at different distances from the camera to a respective scene.

7. The computer-implemented method of claim 1, wherein each of the particular images is captured at a lens focus position that is closest to a center of a depth of field of the images in the particular focus stack of the particular image.

8. The computer-implemented method of claim 1, wherein the loss value is determined based on comparison of the output image and the ground truth image by applying a loss function that includes an L1 loss function and a gradient-L1 loss function.

9. The computer-implemented method of claim 1, wherein generating the input training image that is the input image composition is performed using a random occlusion-based composition technique that includes randomly cropping and/or resizing one or more of the plurality of images in the particular focus stacks to obtain the particular images in the input image composition.

10. The computer-implemented method of claim 1, wherein each of the plurality of scenes is provided on a physical photo or a printout that includes the scene.

11. A system comprising:

a processor; and a memory coupled to the processor, with instructions stored thereon that, when executed by the processor, cause the processor to perform operations comprising:

providing an input image and corresponding phase difference (PD) images as an input to a machine learning model, wherein the input image is associated with an input depth of field;

providing, to the machine learning model, a parameter indicating a target depth of field, wherein the target depth of field is different than the input depth of field;

processing the input image in a depth convolutional neural network (CNN) of the machine learning model, wherein the depth CNN performs an implicit depth estimation for depicted features of the input image based on the corresponding PD images;

processing the input image and implicit depth estimation in a deconvolution CNN of the machine learning model, wherein the deconvolution CNN adjusts blur in pixels of the input image based on the implicit depth estimation to simulate the target depth of field; and providing an output image from the deconvolution CNN that is a modified version of the input image with the adjusted blur.

12. The system of claim 11, wherein the operations further comprise training the CNN ML model by:

obtaining a plurality of images captured with a camera, each image depicting a respective scene of a plurality of scenes, wherein for each scene, multiple focus stacks of images are captured, wherein individual images in each focus stack are captured at a respective lens focus position of a plurality of lens focus positions of the camera, and wherein individual focus stacks of the multiple focus stacks for the scene are captured at a respective distance of a plurality of distances of the camera to the scene;

selecting a training target depth of field that is associated with a particular f-stop of a simulated camera;

generating an input training image that is an input image composition of particular images that are at least portions of the plurality of images, wherein each of the particular images is from a respective particular focus stack of the multiple focus stacks for a different scene of the plurality of scenes;

generating a plurality of input PD image compositions for the input image composition, wherein the input PD image compositions include a plurality of PD images that correspond to the input image composition;

determining a merged image for each particular focus stack, wherein determining the merged image is based on, for each particular focus stack, merging two or more images in the particular focus stack in a focus stacking operation based on the training target depth of field to determine the merged image for the particular focus stack;

generating a ground truth image that is a ground truth composition of the merged images, wherein the ground truth composition corresponds to the input image composition;

providing the input training image, the plurality of input PD image compositions, and the training target depth of field as inputs to the depth CNN of the machine learning model;

outputting, by the deconvolution CNN an output training image, wherein the output training image is obtained by adjusting blurriness in the input training image to obtain the training target depth of field; and updating the machine learning model based on a loss value determined based on comparison of the output training image and the ground truth image, wherein the updating comprises adjusting one or more parameters of the machine learning model based on the loss value.

13. The system of claim 12, wherein determining the merged image for each particular focus stack includes, for each of the particular focus stacks, adjusting distortion of one or more images in the particular focus stack such that all the images in the particular focus stack are matched in distortion to the particular image of the particular focus stack.

14. The system of claim 11, further comprising: a camera coupled to the processor; and a display screen coupled to the processor, and wherein the operations further comprise:

capturing the input image using the camera; and causing the output image to be displayed on the display screen.

15. The system of claim 14, wherein a delay between capturing the input image and causing the output image to be displayed is less than a time threshold such that the output image is displayed on the display screen substantially in real-time.

16. The system of claim 11, further comprising an input device coupled to the processor, and wherein operations further comprise receiving user input indicative the target depth of field via the input device.

17. A computer-implemented method comprising:

providing an input image and corresponding phase difference (PD) images as an input to a machine learning model, wherein the input image is associated with an input depth of field;

providing, to the machine learning model, a parameter indicating a target depth of field, wherein the target depth of field is different than the input depth of field;

processing, by one or more processors, the input image in a depth convolutional neural network (CNN) of the machine learning model, wherein the depth CNN performs an implicit depth estimation for depicted features of the input image based on the corresponding PD images;

processing, by the one or more processors, the input image and implicit depth estimation in a deconvolution CNN of the machine learning model, wherein the deconvolution CNN adjusts blur in pixels of the input image based on the implicit depth estimation to simulate the target depth of field; and providing an output image from the deconvolution CNN that is a modified version of the input image with the adjusted blur.

18. The method of claim 17, further comprising training the CNN ML model by:

obtaining a plurality of images, each image depicting a respective scene of a plurality of scenes, the plurality of images captured with a camera, wherein for each scene, multiple focus stacks of images are captured, wherein individual images in each focus stack are captured at a respective lens focus position of a plurality of lens focus positions of the camera, and wherein individual focus stacks of the multiple focus stacks for the scene are captured at a respective distance of a plurality of distances of the camera to the scene;

selecting a training target depth of field that is associated with a particular f-stop of a simulated camera;

generating an input training image that is an input image composition of particular images that are at least portions of the plurality of images, wherein each of the particular images is from a respective particular focus stack of the multiple focus stacks for a different scene of the plurality of scenes;

generating a plurality of input PD image compositions for the input image composition, wherein the input PD image compositions include a plurality of PD images that correspond to the input image composition;

determining a merged image for each particular focus stack, wherein determining the merged image is based on, for each particular focus stack, merging two or more images in the particular focus stack in a focus stacking operation based on the target depth of field to determine the merged image for the particular focus stack;

generating a ground truth image that is a ground truth composition of the merged images, wherein the ground truth composition corresponds to the input image composition;

providing the input training image, the plurality of input PD image compositions, and the target depth of field as inputs to the depth CNN of the machine learning model;

outputting, by the deconvolution CNN an output training image, wherein the output training image is obtained by adjusting blurriness in the input training image to obtain the training target depth of field; and updating the machine learning model based on a loss value determined based on comparison of the output training image and the ground truth image, wherein the updating comprises adjusting one or more parameters of the machine learning model based on the loss value.

19. The method of claim 18, wherein determining the merged image for each particular focus stack includes, for each of the particular focus stacks, adjusting distortion of one or more images in the particular focus stack such that all the images in the particular focus stack are matched in distortion to the particular image of the particular focus stack.

20. The method of claim 17, further comprising:

capturing the input image using a camera coupled to the one or more processors; and causing the output image to be displayed on a display screen coupled to the one or more processors.

\* \* \* \* \*